(12) United States Patent
Sung et al.

(10) Patent No.: US 12,286,305 B2
(45) Date of Patent: Apr. 29, 2025

(54) VERTICAL TRANSMISSION EQUIPMENT

(71) Applicant: WISTRON CORP., New Taipei (TW)

(72) Inventors: Chen-An Sung, New Taipei (TW); Chi-Neng Weng, New Taipei (TW); Chuan-Sheng Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 273 days.

(21) Appl. No.: 18/152,818

(22) Filed: Jan. 11, 2023

(65) Prior Publication Data

US 2024/0132288 A1 Apr. 25, 2024
US 2024/0228172 A9 Jul. 11, 2024

(30) Foreign Application Priority Data

Oct. 19, 2022 (TW) .................................. 111139562

(51) Int. Cl.
  *B65G 17/12* (2006.01)
  *B65G 17/00* (2006.01)
  *B65G 17/36* (2006.01)

(52) U.S. Cl.
  CPC ......... *B65G 17/123* (2013.01); *B65G 17/007* (2013.01); *B65G 17/365* (2013.01); *B65G 2201/0235* (2013.01); *B65G 2203/042* (2013.01)

(58) Field of Classification Search
  None
  See application file for complete search history.

(56) References Cited

U.S. PATENT DOCUMENTS

| 4,813,752 A * | 3/1989 | Schindler ............. A47B 63/067 198/798 |
| 5,738,225 A | 4/1998 | Kim |
| 6,394,260 B1 * | 5/2002 | Barth ................... B65G 17/485 198/799 |
| 11,878,867 B2 | 1/2024 | Ishikawa |
| 2008/0213080 A1 | 9/2008 | Cachelin et al. |
| 2011/0200419 A1 | 8/2011 | Yamasaki et al. |
| 2022/0348411 A1 | 11/2022 | Ishikawa |

FOREIGN PATENT DOCUMENTS

| CN | 205635636 U | 10/2016 |
| CN | 106185182 A | 12/2016 |
| CN | 109928146 A | 6/2019 |
| CN | 212268727 U | 1/2021 |
| CN | 112322452 A | 2/2021 |
| CN | 212864734 U | 4/2021 |
| CN | 113862255 A | 12/2021 |

(Continued)

OTHER PUBLICATIONS

EP Search Report dated Sep. 22, 2023 in EP aplication No. 23165098.7-1001.

(Continued)

*Primary Examiner* — William R Harp
(74) *Attorney, Agent, or Firm* — McClure, Qualey & Rodack, LLP

(57) ABSTRACT

A vertical transmission equipment includes a base which includes a mount surface, a carrier movably disposed on the base and including a supporting surface, and a positioning assembly disposed on the base and to selectively position the carrier, and the supporting surface of the carrier is perpendicular to the mount surface of the base.

14 Claims, 22 Drawing Sheets

(56) References Cited

FOREIGN PATENT DOCUMENTS

| | | |
|---|---|---|
| CN | 215667912 U | 1/2022 |
| CN | 216155833 U | 4/2022 |
| DE | 10141074 A1 | 3/2003 |
| DE | 102013008872 B4 | 4/2017 |
| JP | S50108163 U | 9/1975 |
| JP | 2021054641 A | 4/2021 |
| TW | M394979 U1 | 8/2009 |
| WO | 2007071988 A1 | 6/2007 |
| WO | 2009145742 A2 | 12/2009 |
| WO | 2018210088 A1 | 11/2018 |

OTHER PUBLICATIONS

TW Office Action dated Jul. 11, 2023 in Taiwan application No. 1111339564.
TW Office Action dated Sep. 20, 2023 in Taiwan application No. 111139562.
JP Office Action dated Jun. 25, 2024 in Japanese application No. 2023-074041.
Final Office Action issued in U.S. Appl. No. 18/155,824, filed Jan. 18, 2023, mailed Oct. 4, 2024.

* cited by examiner

VERTICAL TRANSMISSION EQUIPMENT

CROSS-REFERENCE TO RELATED APPLICATIONS

This non-provisional application claims priority under 35 U.S.C. § 119(a) on Patent Application No(s). 111139562 filed in Taiwan (R.O.C.) on Oct. 19, 2022, the entire contents of which are hereby incorporated by reference.

TECHNICAL FIELD

The disclosure relates to a transfer equipment, more particularly relates to a vertical transmission equipment.

BACKGROUND

On the conventional equipment for extraction, purification, and sample preparation, the well plate is supported and carried by a horizontally rotating platform. However, the horizontally rotating platform takes up horizontal space and therefore is unfavorable for increasing the number of equipment in a laboratory constrained by limited space.

SUMMARY

Accordingly, one aspect of the disclosure is to provide a vertical transmission equipment capable of solving the problem due to conventional equipment.

One embodiment of the disclosure provides a vertical transmission equipment including a base which includes a mount surface, a carrier movably disposed on the base and including a supporting surface, and a positioning assembly disposed on the base, the carrier is selectively positioned by the positioning assembly, and the supporting surface of the carrier is perpendicular to the mount surface of the base.

One embodiment of the disclosure provides a vertical transmission equipment including a base, a carrier, and a positioning assembly, the carrier is movably disposed on the base and includes a supporting surface, the positioning assembly is disposed on the base, the carrier is selectively positioned by the positioning assembly, in a normal direction of the supporting surface, the supporting surface of the carrier and the base are located without overlapping with each other.

One embodiment of the disclosure provides a vertical transmission equipment including a base, a carrier, and a positioning assembly, the carrier includes a supporting surface and is movably disposed on the base along a transmission path, the positioning assembly is disposed on the base, the carrier is selectively positioned by the positioning assembly, and the supporting surface is perpendicular to an imaginary plane which is defined by the transmission path of the carrier.

According to the vertical transmission equipments as discussed in the above embodiments of the disclosure, the supporting surface of the carrier is perpendicular to the mount surface of the base, the supporting surface of the carrier does not overlap with the rail structure in the normal line of the supporting surface of the carrier, or the supporting surface of the carrier is perpendicular to the imaginary plane which is defined by the transmission path of the carrier, thus the supporting surface of the carrier is kept in an angle perpendicular to the base. In other words, the vertical transmission equipment achieves a well plate carrier capable of movable in vertical manner, which makes the vertical transmission equipment take lesser horizontal space and therefore is favorable for increasing the number of equipments in a laboratory constrained by limited space.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
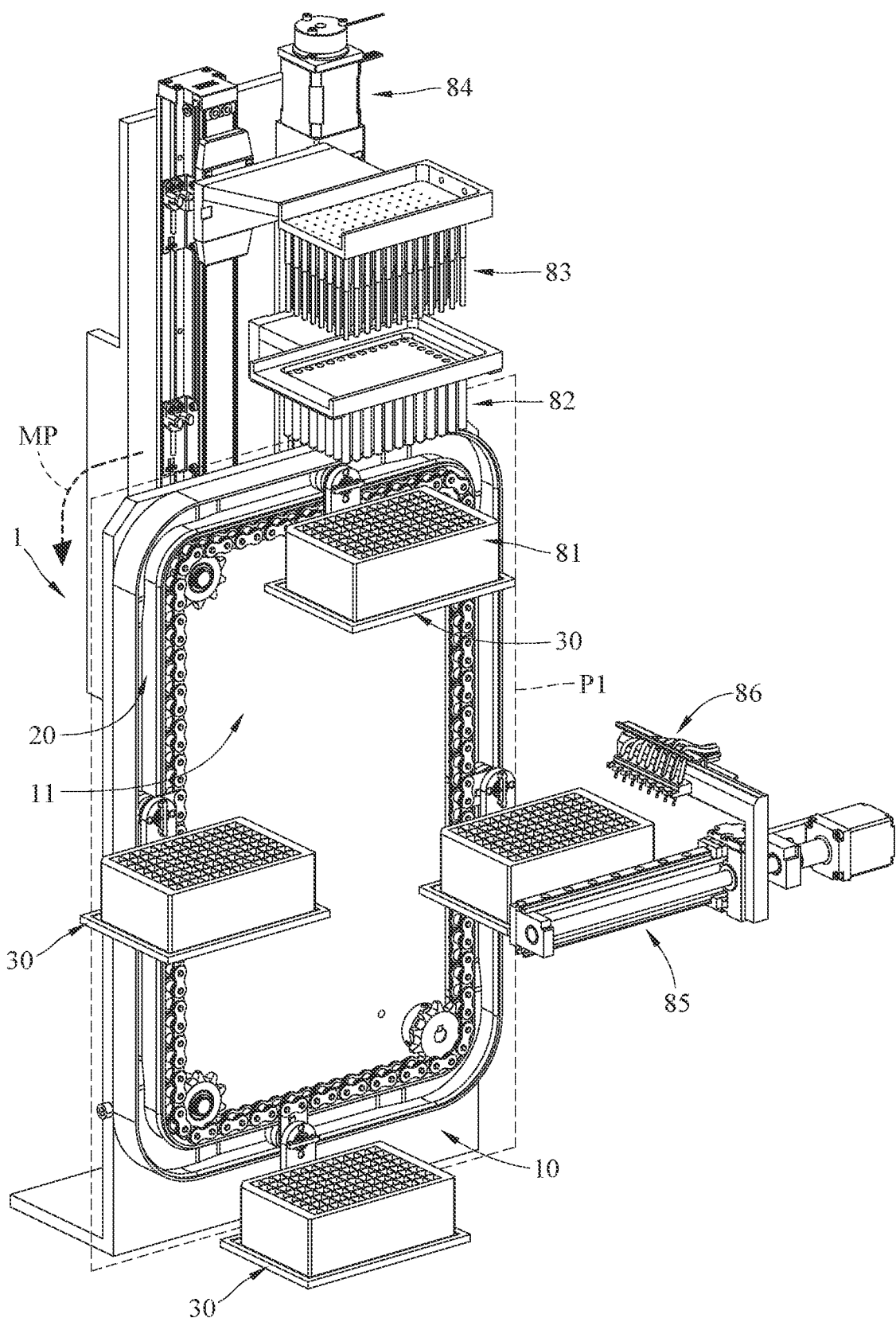
FIG. 1 is a perspective view of a vertical transmission equipment according to one embodiment of the disclosure.
Figure 2:
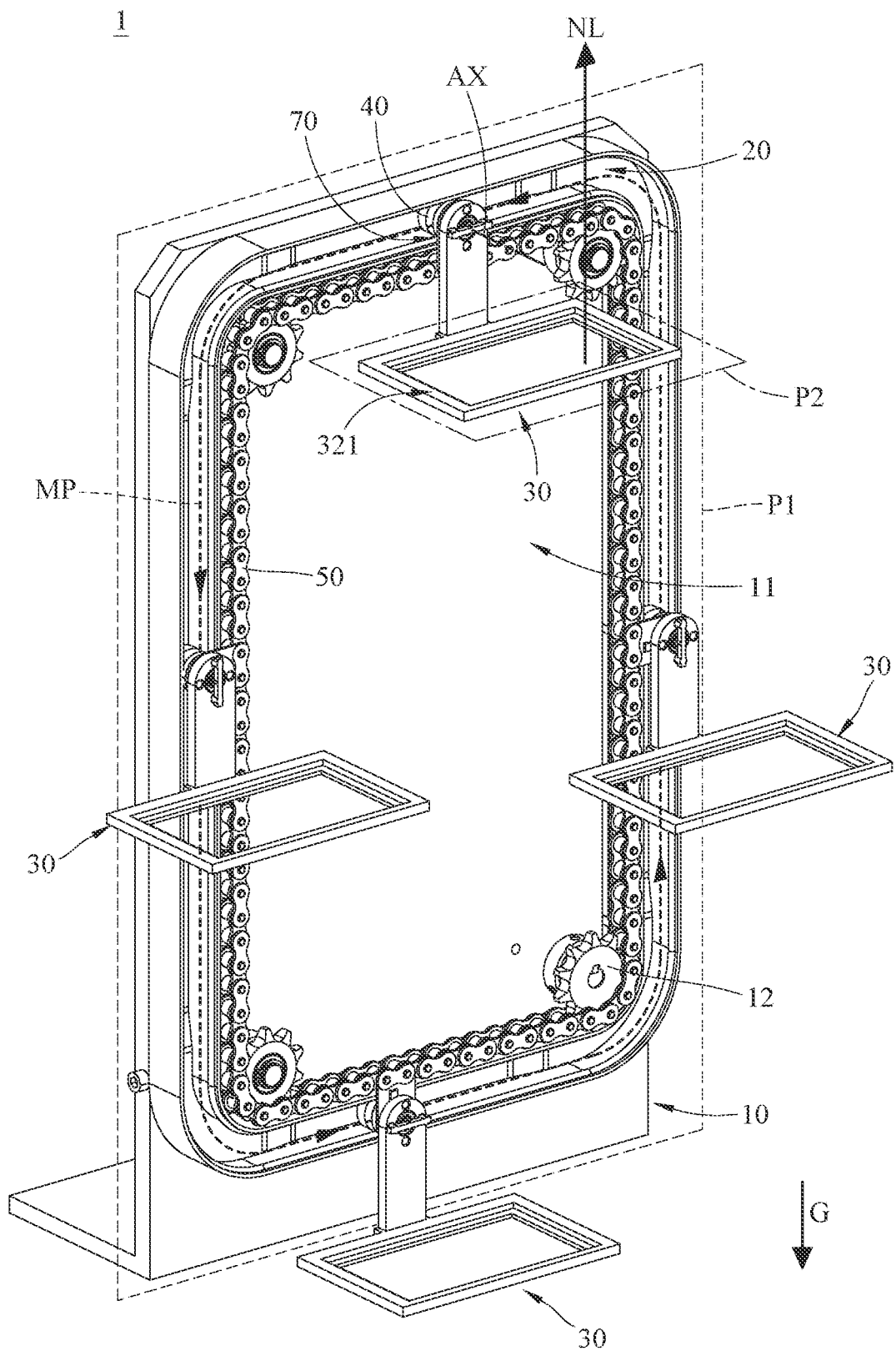
FIGS. 2-3 are partial perspective views of a vertical transmission equipment according to one embodiment of the disclosure taken from different view angles.
Figure 3:
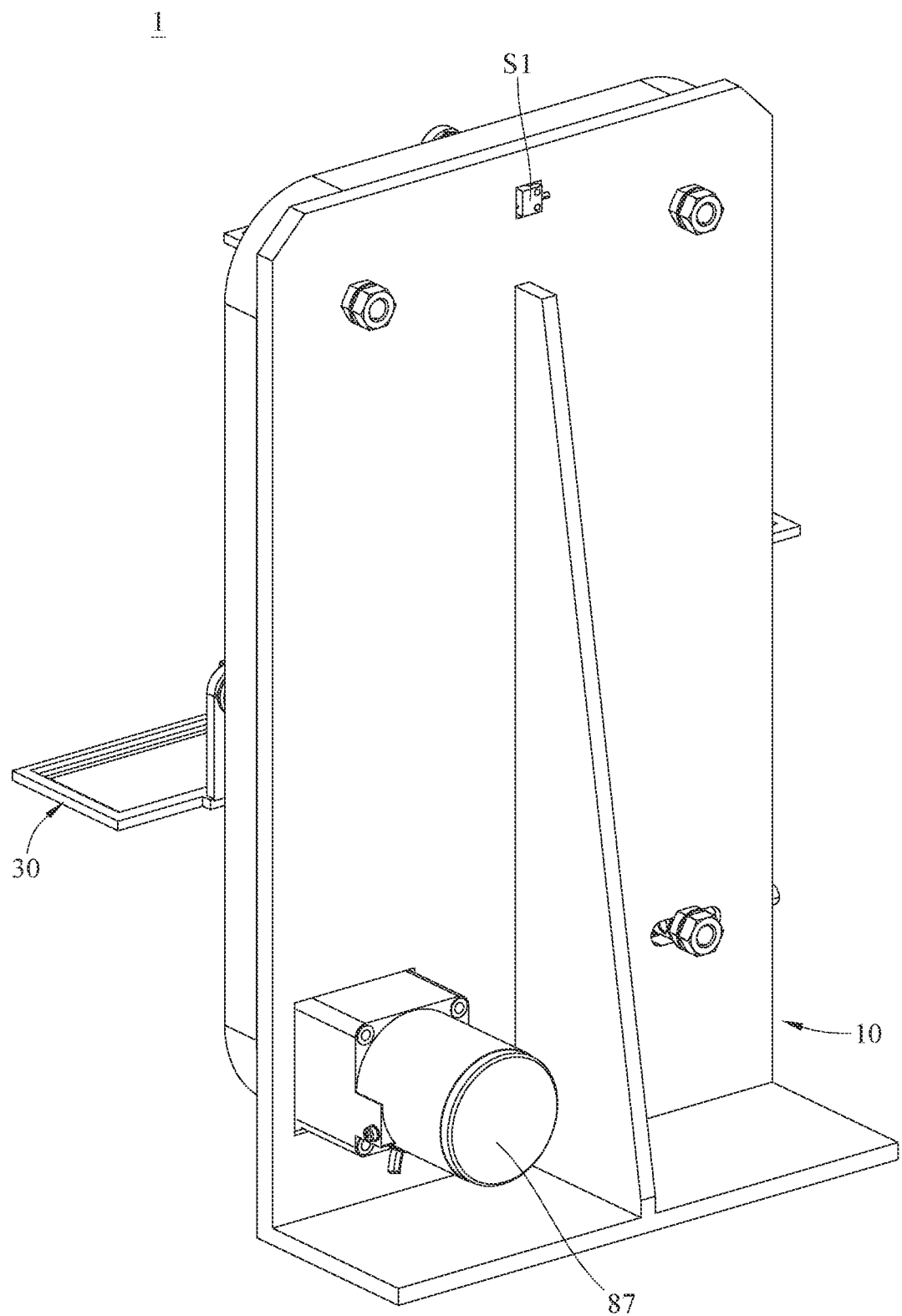

Firstly, referring to FIGS. 1-3, one embodiment of the disclosure provides a vertical transmission equipment 1, the vertical transmission equipment 1 may include a base 10, a rail structure 20, and a carrier 30. The rail structure 20 is disposed on the base 10. As shown, the base 10 may have a mount surface 11, the mount surface 11 means the surface of the base 10 in which the rail structure 20 is located. The carrier 30 is movably disposed on the rail structure 20 and therefore the carrier 30 is movable along a transmission path MP on the rail structure 20 relative to the base 10. In other words, the rail structure 20 defines the transmission path MP for the carrier 30 to move relatively to the base 10. In this embodiment, the rail structure 20 may be a closed loop rail in a required shape, thus, as shown, the transmission path MP of the carrier 30 may be a closed loop on an imaginary plane P1. Note that imaginary plane P1 is defined by the transmission path MP. As such, the carrier 30 is able to be repeatedly moved to different areas of the base 10 along the transmission path MP.

The carrier 30 may include a supporting surface 321, the supporting surface 321 may be a flat surface of the carrier 30 configured for supporting a well plate 81; in other words, the supporting surface 321 means a surface of the carrier 30 that is used to support the well plate 81. An imaginary plane P2 in which the supporting surface 321 is located is perpendicular to the imaginary plane P1 which is defined by the transmission path MP. Note that the imaginary plane P2 is defined by the supporting surface 321. In other words, the supporting surface 321 of the carrier 30 may be perpendicular to the mount surface 11 of the base 10 and the rail structure 20. Thus, in the normal line of the supporting surface 321 (i.e., a normal line NL of the imaginary plane P2), the supporting surface 321 of the carrier 30 does not overlap with the rail structure 20 and the mount surface 11 of the base 10, such that the supporting surface 321 of the carrier 30 is kept at an angle perpendicular to the base 10 and the rail structure 20 when moving. As such, the vertical transmission equipment 1 takes up lesser horizontal or lateral space and therefore there is favorable for increasing the number of vertical transmission equipments in a limited space.

The well plate 81 may be any suitable multiwell plate with multiple sample wells used as small test tubes. For example, the well plate 81 may have 96, lesser, or more sample wells arranged in a matrix. The well plate 81 may be movable relative to the base 10 along the transmission path MP by being carried by the carrier 30. Note that the number of the carrier 30 that the base 10 can support may be modified as required and not intended to limit the disclosure. It is also noted that the well plate that the carrier 30 can support is merely provided for better understanding the disclosure but is not intended to limit the disclosure.

In this embodiment, the vertical transmission equipment 1 may further include a roller member 40. The roller member 40 is movably disposed on the rail structure 20 and therefore is only allowed to be movable along the transmission path MP relative to the base 10. The carrier 30 is pivotally connected to the roller member 40 about an axis AX. Thus, the carrier 30 is movable along the transmission path MP and is rotatable about the axis AX relative to the base 10 and the rail structure 20.

Since the carrier 30 is pivotally connected to the roller member 40, the gravitational force can naturally correct the carrier 30 to a position that makes the normal line NL of its supporting surface 321 parallel to the direction of gravity G; in other words, when the rail structure 20 is placed in vertical manner, the supporting surface 321 of the carrier 30 may be self-positioned to be horizontal manner by gravitational force, thereby automatically correcting the angle of the well plate 81 to be horizontal during the movement of the carrier 30 relative to the base 10.

Optionally, the vertical transmission equipment 1 may be cooperated with a sleeve set 82, a magnetic rod set 83, and a lifting mechanism 84. The lifting mechanism 84 may be disposed on the base 10. The sleeve set 82 and magnetic rod set 83 may be connected to different rails of the lifting mechanism 84 and therefore can be moved in vertical direction separately. When the carrier 30 moves the well plate 81 to be under the sleeve set 82 and the magnetic rod set 83, the lifting mechanism 84 may move the sleeve set 82 and magnetic rod set 83 into the wells of the well plate 81 in the required order, the lifting mechanism 84 then can cause the sleeve set 82 and magnetic rod set 83 to vibrate in a predetermined manner so as to perform the required process to the substance stored in the wells.

Optionally, the vertical transmission equipment 1 may be cooperated with a feeding mechanism 85 and a substance feeder 86. The feeding mechanism 85 may be disposed on the base 10 or disposed on an external structure so as to be located adjacent to the base 10. The substance feeder 86 is connected to and movable by the feeding mechanism 85. The substance feeder 86 may be moved horizontally by being driven by the feeding mechanism 85. As such, when the carrier 30 moves the well plate 81 along the transmission path MP to a side of the base 10 that corresponds to the feeding mechanism 85, the feeding mechanism 85 can move the substance feeder 86 to above the well plate 81 so that the substance feeder 86 can add required substance into the selected wells.

It is noted that the vertical transmission equipment 1 may use the carrier 30 to move the well plate 81 to another selected area of the base 10 for performing another process, but the disclosure is not limited thereto.

The vertical transmission equipment 1 may further include a power source 87, a plurality of transmission gears 12, and a transmission component 50. The transmission gears 12 are pivotally disposed on the mount surface 11 of the base 10 and are arranged adjacent to the rail structure 20. The power source 87 may be any suitable motor. The power source 87 may be disposed on the base 10 and connected to one of the transmission gears 12, thus the power source 87 is able to rotate the transmission gear 12 relative to the base 10. The transmission component 50 may be any suitable gear chain capable of meshing with the transmission gears 12. The transmission component 50 may be arranged along the rail structure 20 (or, along the transmission path MP) and is movably disposed on the base 10 via the transmission gears 12. As such, the transmission gear 12 that is connected to the power source 87 can simultaneously cause the other transmission gears 12 to rotate via the transmission component 50 when being driven by the power source 87.

Figure 4:
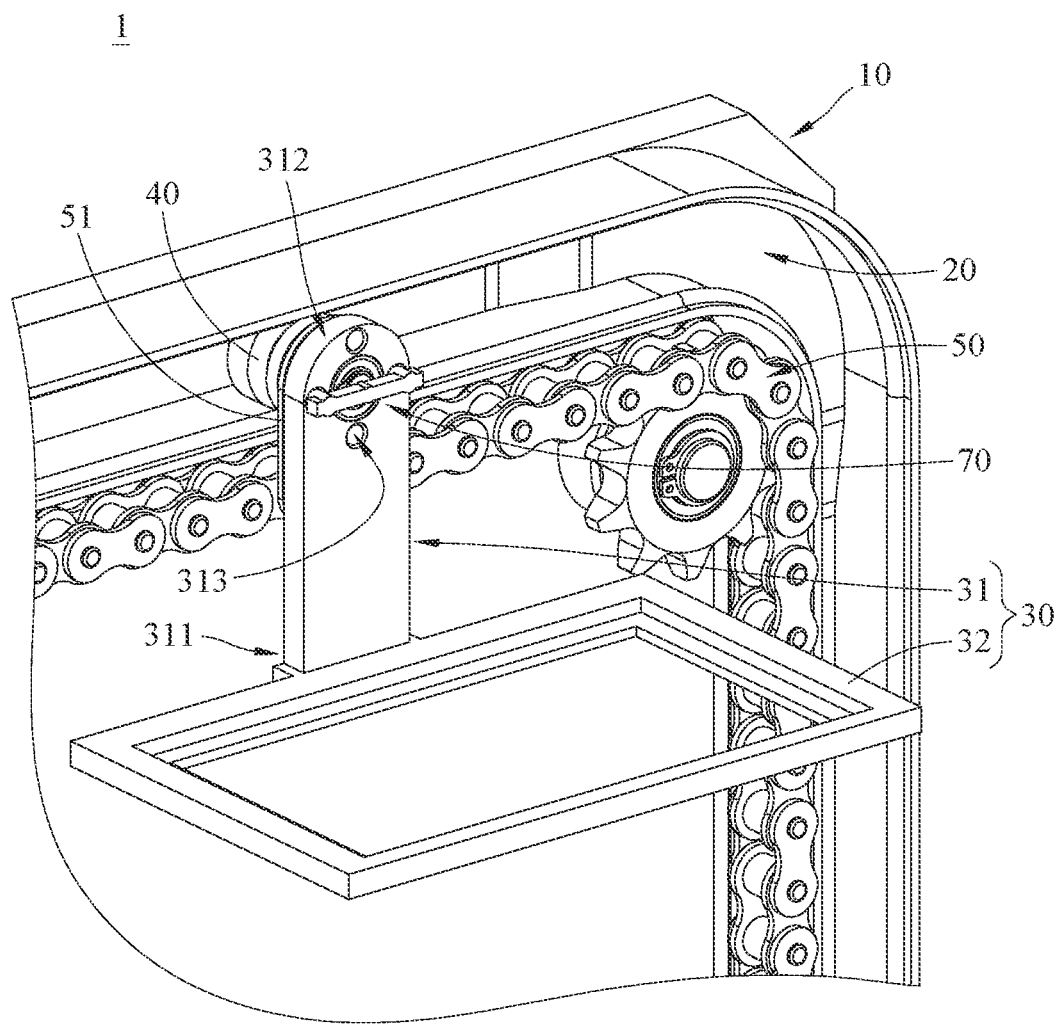
FIGS. 4-5 are partially-enlarged views of a vertical transmission equipment according to one embodiment of the disclosure.
Figure 5:
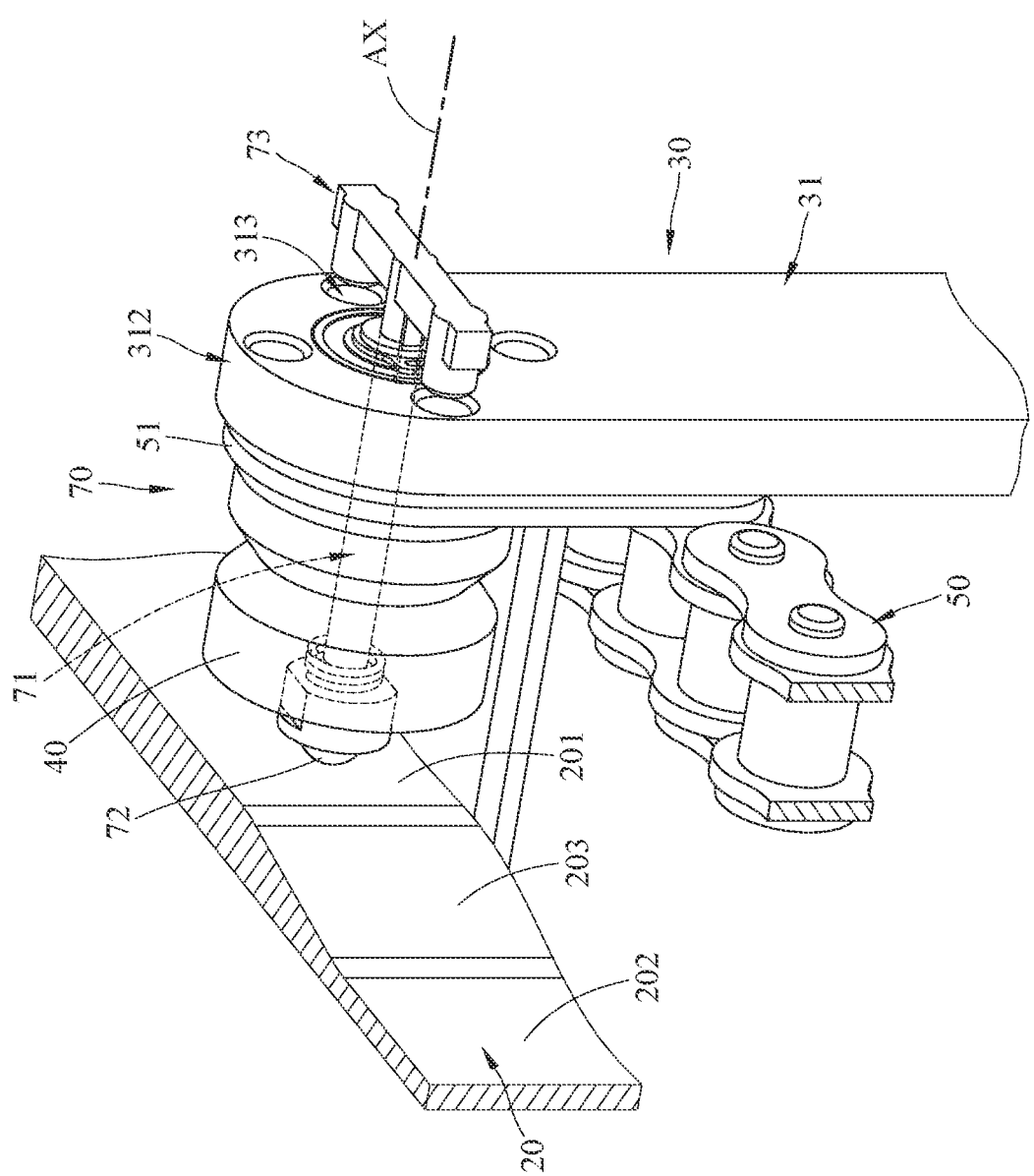
Figure 6:
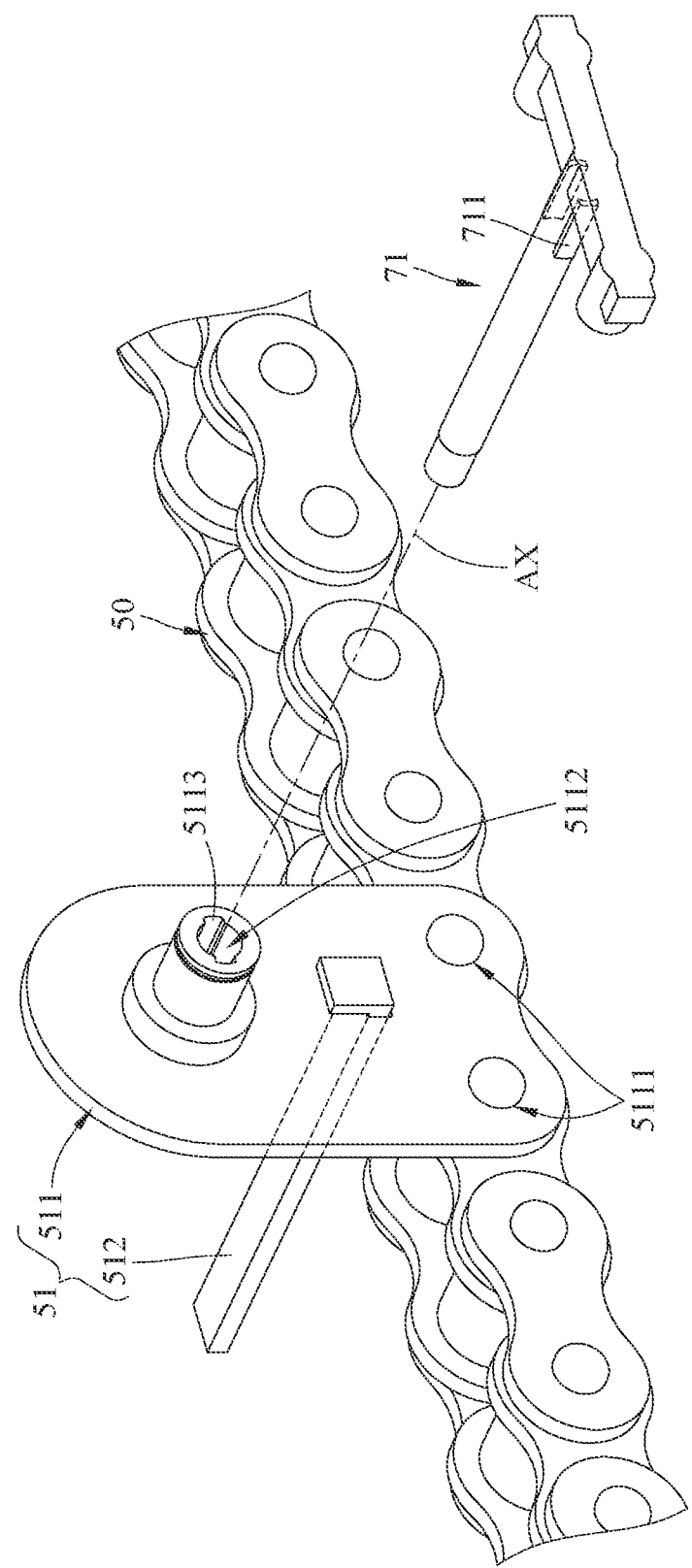
FIG. 6 is a partially enlarged view of the transmission component of a vertical transmission equipment according to one embodiment of the disclosure.
Figure 7:
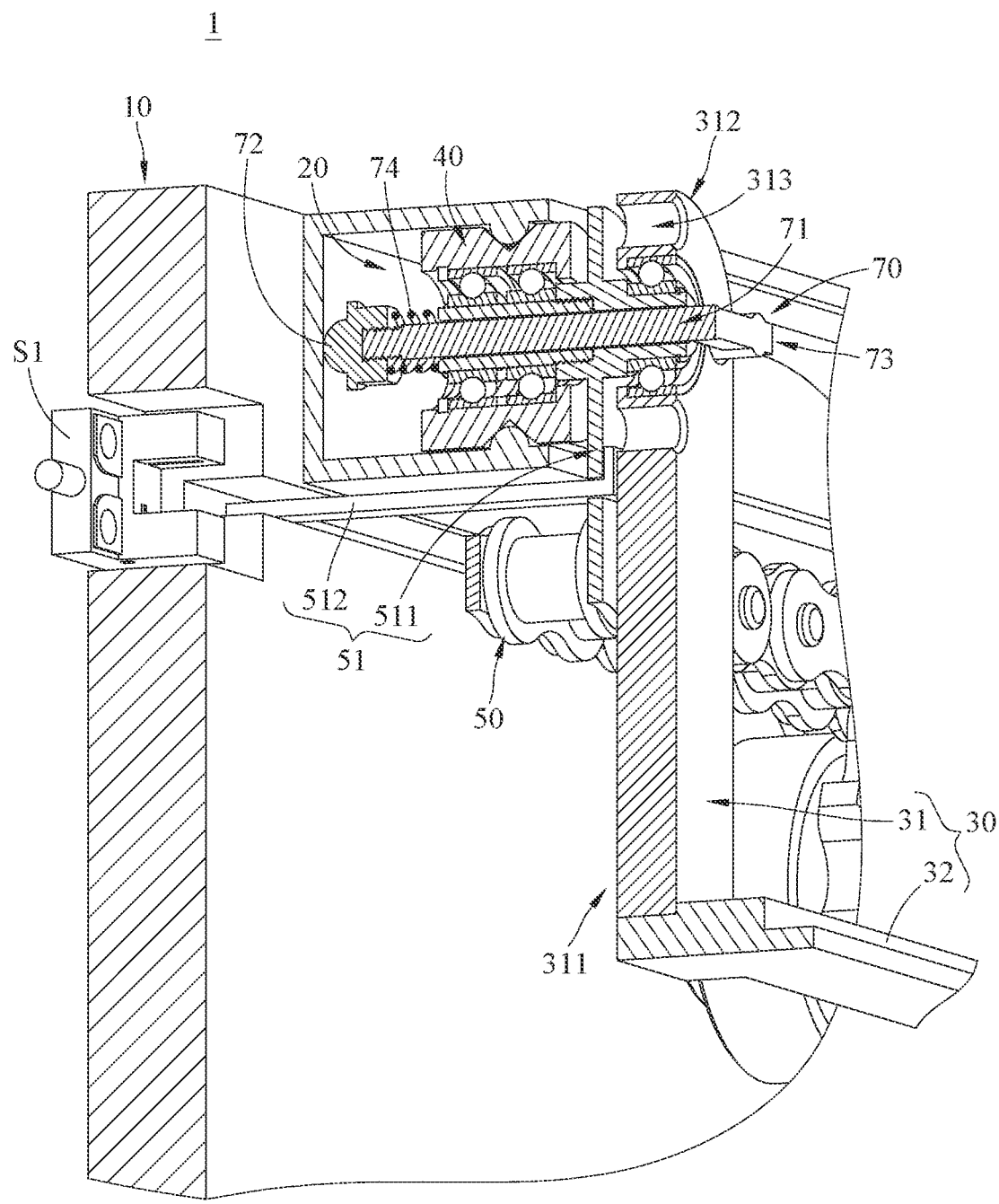
FIG. 7 is a partially-enlarged cross-sectional view of a vertical transmission equipment according to one embodiment of the disclosure.
Figure 8:
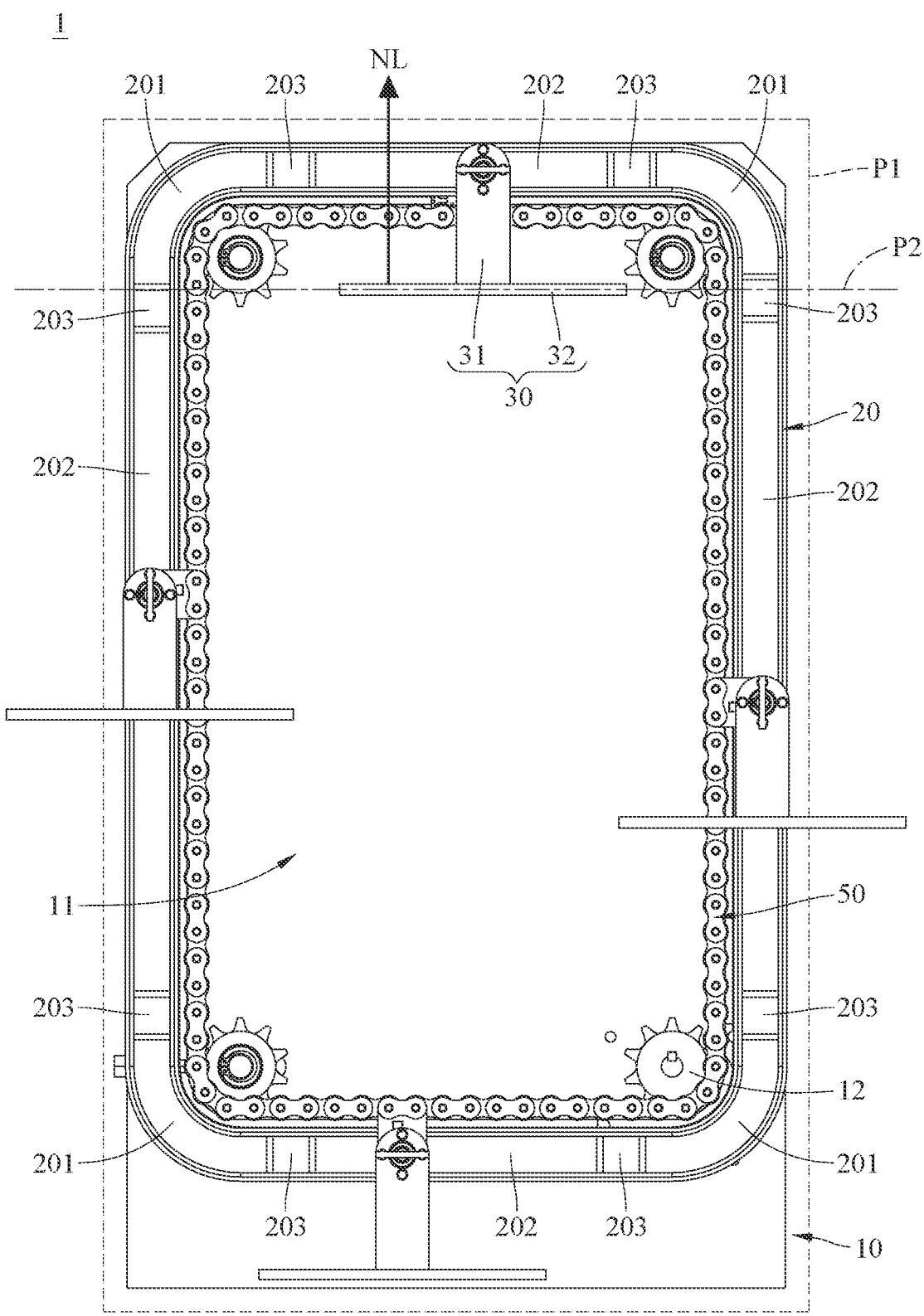
FIG. 8 is a front view of a vertical transmission equipment according to one embodiment of the disclosure.
Figure 9:
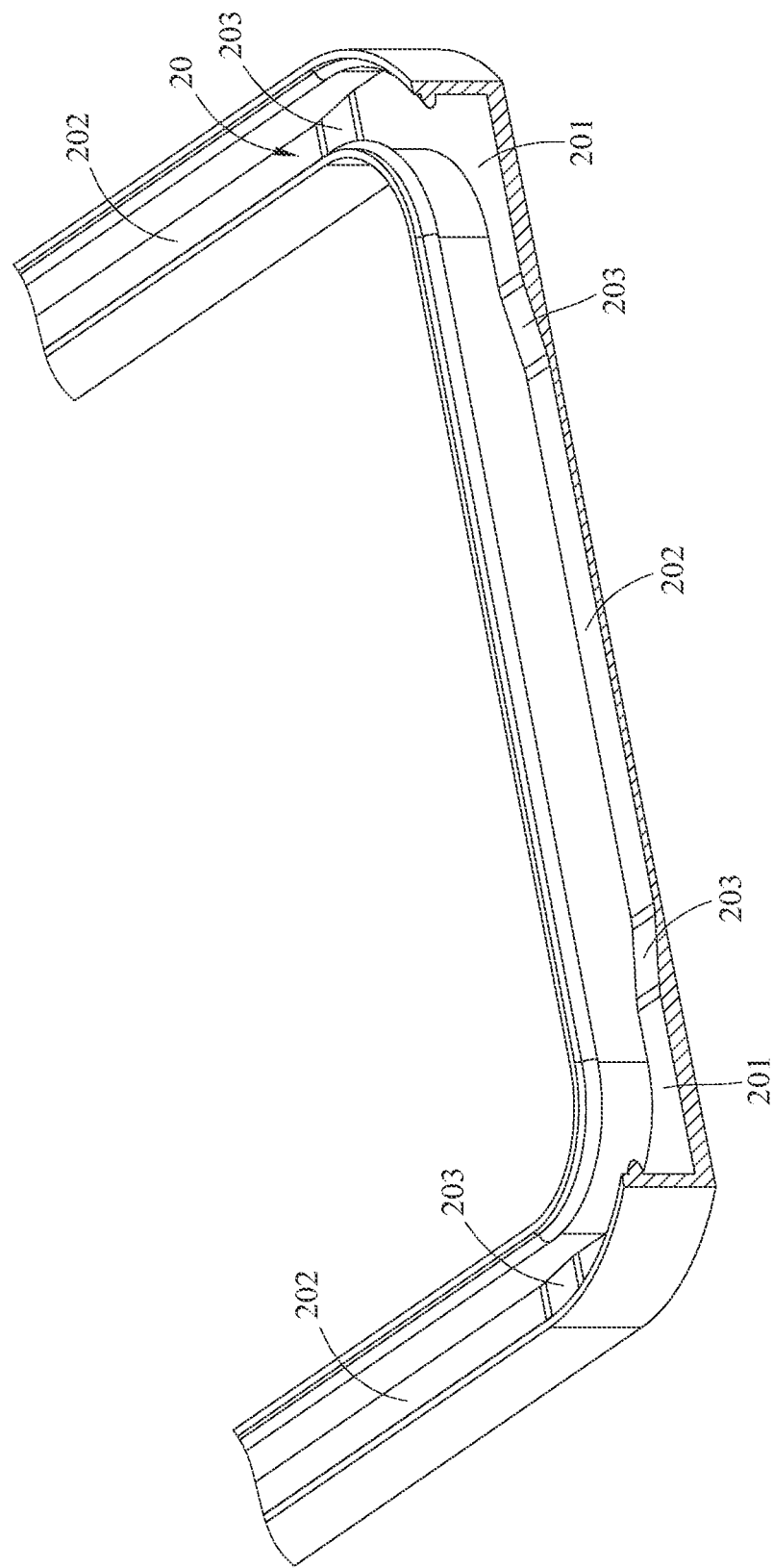
FIG. 9 is a partially enlarged view of the rail structure of a vertical transmission equipment according to one embodiment of the disclosure.

Please refer to the aforementioned figures and further refer to FIGS. 4-9, where FIG. 4 is a partially-enlarged view of the vertical transmission equipment 1, FIG. 5 is a partially enlarged view of FIG. 4, FIG. 6 is a partially enlarged view of the transmission component 50, FIG. 7 is a partially-enlarged cross-sectional view of the vertical transmission equipment 1, FIG. 8 is a front view of the vertical transmission equipment 1, and FIG. 9 is a partially enlarged cross-sectional view of the rail structure 20.

In this embodiment, the vertical transmission equipment 1 may further include a shaft 71. The shaft 71 is disposed through the roller member 40. The transmission component 50 may include a plurality of outer plates. The shaft 71 may be inserted into one of the outer plates of the transmission component 50 (e.g., an outer plate 51). As shown, the outer plate 51 may include a plate portion 511. The plate portion 511 may include a shaft hole 5112 and a mount portion 5111. The shaft 71 is disposed through the shaft hole 5112. The outer plate 51 is fixed to other parts of the transmission component 50 (not numbered, such as inner plate and rollers) via its mount portion 5111.

In this embodiment, the shaft 71 may include a meshing structure 711 formed on an outer surface thereof, and the plate portion 511 may further include a meshing structure 5113 formed on an inner surface which defines the shaft hole 5112. The meshing structure 711 and the meshing structure 5113 extend along the axis AX and mate each other in shape, thus the meshing structure 711 and the meshing structure 5113 can be meshed with each other. The engagement of the meshing structure 711 and the meshing structure 5113 only permits the shaft 71 to move along the axis AX relative to the outer plate 51 and therefore can prevent the shaft 71 from rotating about the axis AX relative to the outer plate 51.

The carrier 30 may include a bridging structure 31 and a supporting structure 32. The supporting structure 32 means the part of the carrier 30 used to support the well plate 81. The supporting structure 32 may include the supporting surface 321. The bridging structure 31 may be pivotally disposed on the shaft 71 and connects the supporting structure 32, thus, the supporting structure 32 is connected to the shaft 71 via the bridging structure 31 and the bridging structure 31 is pivotally connected to the roller member 40 via the shaft 71. The bridging structure 31 may include a connecting portion 311 and a distal portion 312 which are located opposite to each other. The connecting portion 311 means the portion of the bridging structure 31 in which the supporting structure 32 is connected to the bridging structure 31, and the distal portion 312 means the portion of the bridging structure 31 that is pivotally sleeved on the shaft 71.

At least part of the outer plate 51 of the transmission component 50 may be pivotally connected to and located between the bridging structure 31 of the carrier 30 and the roller member 40, thus, the carrier 30 and the roller member 40 are both rotatable relative to the outer plate 51. When the power source 87 causes the transmission component 50 to move by driving the transmission gear 12 connected thereto, the power source 87 is able to move the shaft 71 which penetrates through the carrier 30 and the roller member 40 via the outer plate 51 of the transmission component 50, thereby causing the shaft 71, the carrier 30 and the roller member 40 to move along the transmission path MP.

It is noted that the vertical transmission equipment 1 may selectively position the carrier 30 in the selected area of the base 10 that is favorable for keeping the carrier 30 in horizontal position. For example, the vertical transmission equipment 1 may selectively move the carrier 30 to a specific position that the supporting surface 321 of the carrier 30 and the well plate 81 on the carrier 30 can kept in horizontal due to gravitational force.

Specifically, the vertical transmission equipment 1 may further include a positioning assembly 70, the positioning assembly 70 may include the shaft 71, a contacting structure 72, a positioning structure 73, and an elastic component 74.

The contacting structure 72 and the positioning structure 73 are respectively located at two opposite ends of the shaft 71. For example, the contacting structure 72 may be movably located at a side of the roller member 40 which is located away from the carrier 30, and the positioning structure 73 may be movably located at a side of the carrier 30 which is located away from the roller member 40. At least part of the positioning structure 73 extends towards the roller member 40.

The contacting structure 72 means that part of the positioning assembly 70 used to be in direct contact with the surface of the rail structure 20. Correspondingly, the rail structure 20 may include at least one first flat portion 201, at least one second flat portion 202, and at least one slope portion 203. The first flat portion 201 and the second flat portion 202 mean the flat surfaces of the rail structure 20 which may be parallel to each other and may be parallel to the mount surface 11 of the base 10 (or, the imaginary plane P1). The first flat portion 201 and the second flat portion 202 are used to be in direct contact with the contacting structure 72. The first flat portion 201 and the second flat portion 202 may not be coplanar with each other; specifically, in the axis AX, the first flat portion 201 and the second flat portion 202 may be displaced from each other. For example, the first flat portion 201 means a flat surface of the rail structure 20 that is located relatively close to the carrier 30, and the second flat portion means another flat surface of the rail structure 20 that is located relatively away from the carrier 30; in other words, in this embodiment, the first flat portion 201 is located closer to the carrier 30 than the second flat portion. The slope portion 203 means a slanted surface of the rail structure 20 that is connected between and inclined relative to the first flat portion 201 and the second flat portion 202; the slope portion 203 can be considered as a transition between the first flat portion 201 and the second flat portion 202. Optionally, in this embodiment, the second flat portions 202 and the slope portions 203 may be arranged at the straight portions of the rail structure 20 while the first flat portions 201 may be arranged at the corners of the rail structure 20.

During the movement of the carrier 30 along the transmission path MP, the contacting structure 72 of the positioning assembly 70 selectively contact and slides over the first flat portion 201, the second flat portion 202, or the slope portion 203, such that the surface contour formed by the first flat portion 201, the second flat portion 202, and the slope portion 203 can cause the contacting structure 72 of the positioning assembly 70, the shaft 71, and the positioning structure 73 to move forward and backward along the axis AX.

Corresponding to the positioning structure 73, the carrier 30 may further include at least one positioning hole 313. There may be two positioning holes 313 located at the distal portion 312 of the bridging structure 31, and the shaft 71 may be located between the positioning holes 313. When the carrier 30 is moved to a specific area, the cooperation of the surface contour of the rail structure 20 and the contacting structure 72 may cause the positioning structure 73 of the positioning assembly 70 to removably insert into the positioning holes 313 of the carrier 30 so as to prevent the carrier 30 from rotating relative to the base 10.

The elastic component 74 may be any suitable compression spring. The elastic component 74 may be sleeved on the shaft 71. The elastic component 74 may be located between and in contact with the roller member 40 and the contacting structure 72 so as to force the contacting structure 72 to move in a direction away from the roller member 40. Thus, the elastic component 74 is able to keep the contacting structure 72 contacting and pressing against the first flat portion 201, the second flat portion 202, or the slope portion 203 of the rail structure 20; meanwhile, the elastic component 74 can force the shaft 71 and the positioning structure 73 to move towards the rail structure 20.

Optionally, the vertical transmission equipment 1 may further include a first sensor S1, and the transmission component 50 may further include a protrusion structure 512 protruding from the plate portion 511. The first sensor S1 may be disposed on the base 10. For example, the first sensor S1 may be disposed on or adjacent to the path that the protrusion structure 512 travels. When the first sensor S1 senses the protrusion structure 512, the carrier 30 is determined to be in the predetermined position.

In this embodiment, the first flat portion 201 may be located relatively close to the bridging structure 31 of the carrier 30 than the second flat portion 202, thus, when the contacting structure 72 of the positioning assembly 70 is located at (or, contacts) the first flat portion 201, the first flat portion 201 can keep the contacting structure 72 in a position that makes the positioning structure 73 located away from the positioning holes 313 of the carrier 30. When the contacting structure 72 of the positioning assembly 70 is located at (or, contacts) the second flat portion 202, the second flat portion 202 can keep the contacting structure 72 in a position that makes the positioning structure 73 inserted into the positioning holes 313 of the carrier 30 and thereby securing the angle and position of the carrier 30.

Figure 10:
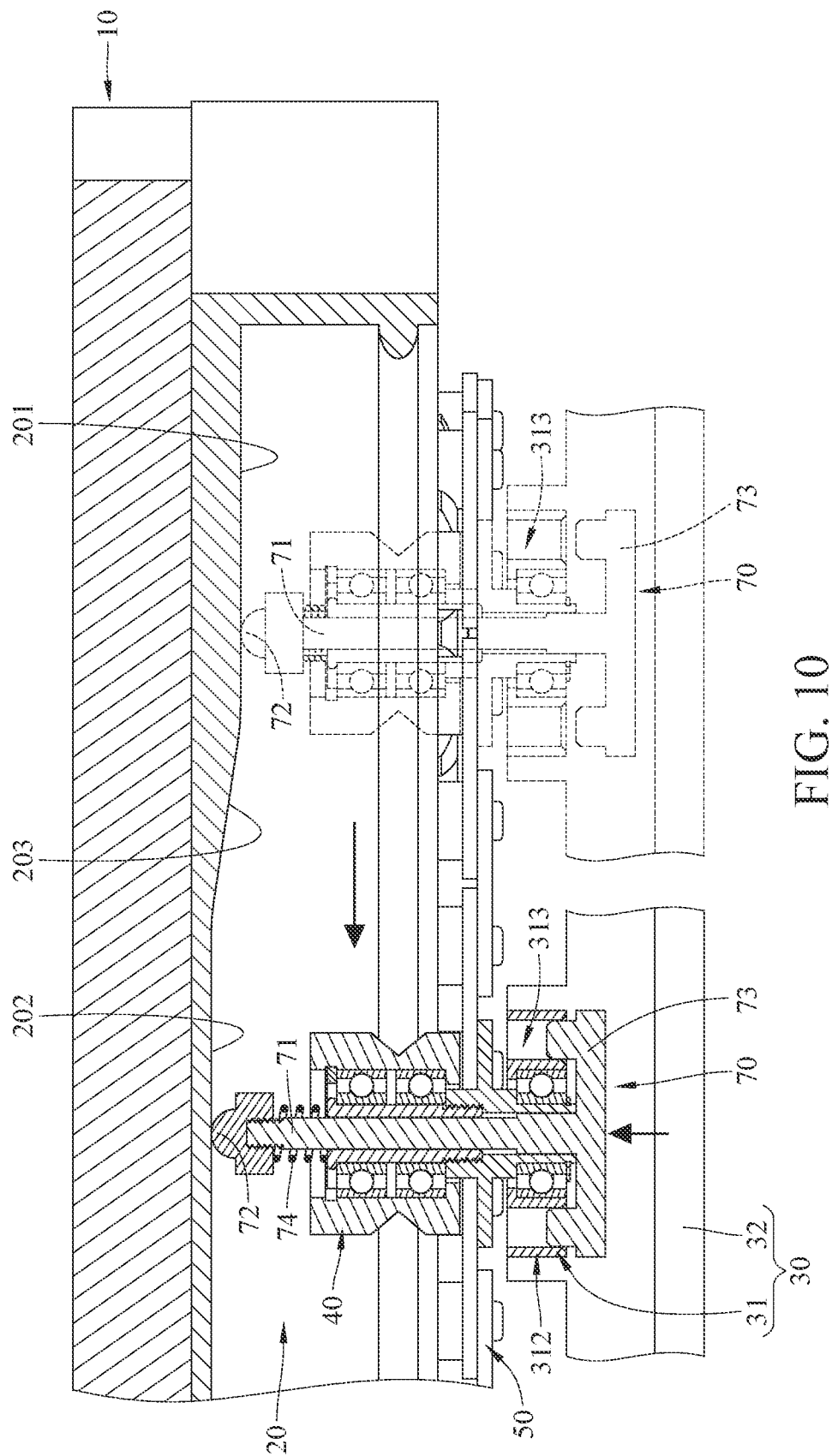
FIG. 10 depicts the movement of the positioning assembly of a vertical transmission equipment according to one embodiment of the disclosure.

Specifically, please refer to FIG. 5 and further refer to FIG. 10, where FIG. 5 depicts that the carrier 30 is not yet positioned by the positioning assembly 70, and FIG. 10 depicts the movement of the carrier 30 relative to the base 10 that causes the positioning assembly 70 to position the carrier 30. Such a depicted movement of the carrier 30 can be achieved by the movement of the outer plate 51 of the transmission component 50 that moves the shaft 71 and the positioning assembly 70 along the transmission path MP. The first flat portion 201 is located closer to the bridging structure 31 of the carrier 30 than the second flat portion 202 (in other words, the second flat portion 202 is located further away from the bridging structure 31 of the carrier 30 than the first flat portion 201), thus, as shown in FIG. 5 or the dashed-lines in FIG. 10, when the contacting structure 72 of the positioning assembly 70 is at the first flat portion 201, the first flat portion 201 keeps the contacting structure 72 in a position that makes the positioning structure 73 stays away from the positioning holes 313 of the carrier 30, such that the carrier 30 at this moment is rotatable relative to the transmission component 50 by gravitational force while traveling along the transmission path MP.

As can be seen from the solid lines in FIG. 10, when the transmission component 50 moves the carrier 30 and the positioning assembly 70 over the slope portion 203 and get them to a position that corresponds to the second flat portion 202, the contacting structure 72 keeps contacting the rail structure 20 by being forced by the elastic component 74 and therefore the contacting structure 72 moves along the surface contour of the rail structure 20 to cause the positioning structure 73 to insert into the positioning holes 313 of the carrier 30. As such, the positioning assembly 70 can secure the angle and position of the carrier 30 when the positioning structure 73 engages the bridging structure 31. Meanwhile, the shaft 71 is unable to rotate relative to the outer plate 51 of the transmission component 50, thus, when the positioning structure 73 is inserted into the positioning holes 313 of the carrier 30, the carrier 30 is prevented from rotating or pivoting relative to the transmission component 50. When the contacting structure 72 contacts the second flat portion 202, the transmission component 50 can keep moving the carrier 30 along the transmission path MP. When the first sensor S1 senses the protrusion structure 512 (in other words, when the protrusion structure 512 reaches the area that can be sensed by the first sensor S1), the carrier 30 is determined to be reaching a predetermined position and therefore the power source 87 stops the transmission component 50 to stop the carrier 30 at the current position for performing associated process. Optionally, after a predetermined period of time, the power source 87 can move the transmission component 50 again so as to move the carrier 30 along the transmission path MP to the next stop.

As introduced, the cooperation of the contacting structure 72 of the positioning assembly 70 and the surface contour of the rail structure 20 can selectively cause the positioning structure 73 of the positioning assembly 70 to secure and limit the angle and position of the carrier 30 when the carrier 30 reaches a predetermined area.

It is noted that the previous vertical transmission equipment is one of exemplary embodiments of the disclosure but is not intended to limit the disclosure. It is also noted that the vertical transmission equipment can be modified as required. The following provides vertical transmission equipments of other embodiments which are capable of achieving the effect the same as shown in, for example, FIG. 10, but for the purpose of simplicity, only the main differences between the introduced embodiment and the previous embodiments will be described in detail, and the same or similar parts can be comprehended with reference to the corresponding paragraphs and thus will not be repeatedly described hereinafter. It is also noted that the same reference number denote the same component or element.

Figure 11:
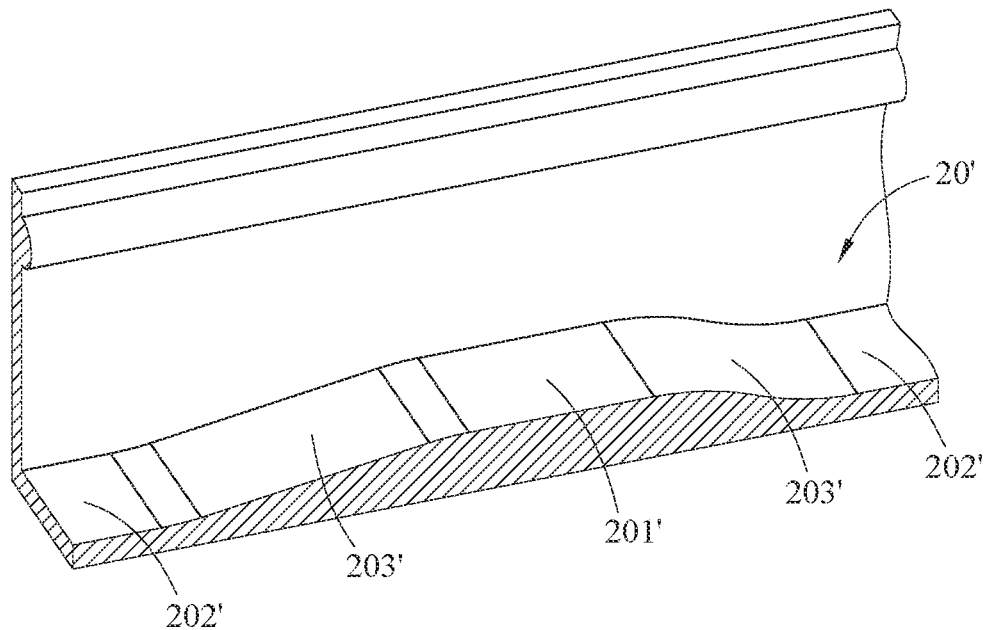
FIG. 11 is a partially enlarged view of the rail structure of a vertical transmission equipment according to one embodiment of the disclosure.
Figure 12:
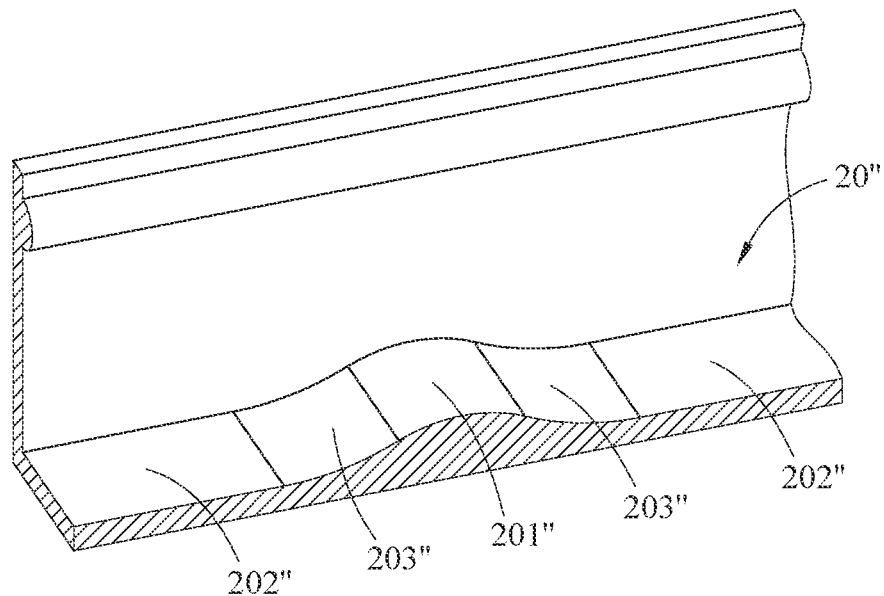
FIG. 12 is a partially enlarged view of the rail structure of a vertical transmission equipment according to one embodiment of the disclosure.

For example, the surface contour of the rail structure for contacting the contacting structure of the positioning assembly may be modified according to, such as how the carrier is required to be moved or stopped. Please refer to FIG. 11, another embodiment of the disclosure provides a rail structure 20', the rail structure 20' may include a first flat portion 201', a second flat portion 202', and a slope portion 203' which are not arranged at the corners of the rail structure 20', where the slope portion 203' may have a mild curvature to achieve the required speed of how the positioning assembly holds or releases the carrier. Please refer to FIG. 12, another embodiment of the disclosure provides a rail structure 20", the rail structure 20" may include a first flat portion 201", a second flat portion 202", and a slope portion 203" which are not arranged at the corners of the rail structure 20", where the slope portion 203" may be a steeper slope to achieve the required speed of how the positioning assembly holds or releases the carrier.

Figure 13:
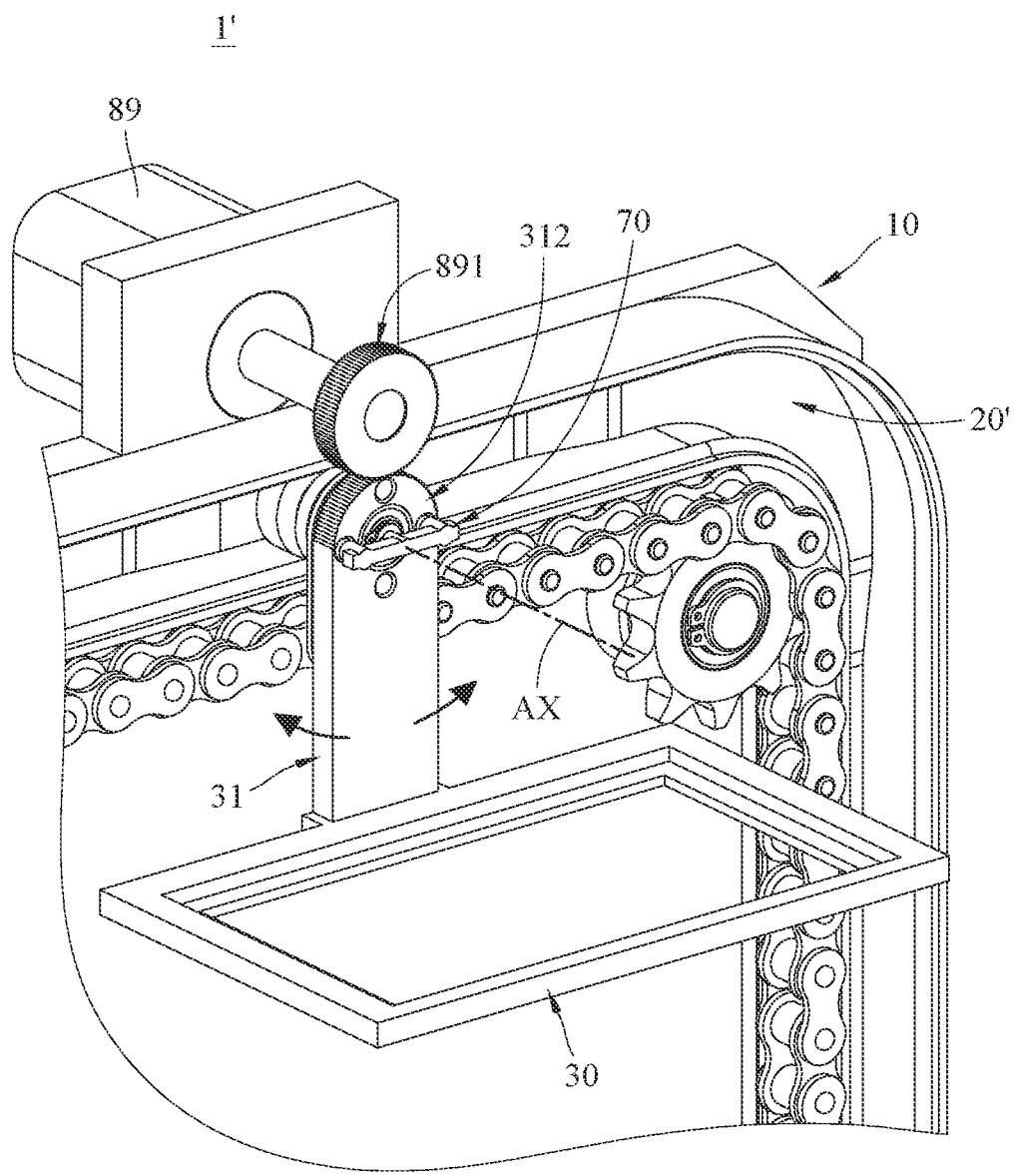
FIG. 13 is a partially enlarged view of a vertical transmission equipment according to one embodiment of the disclosure.

Please refer to FIG. 13, another embodiment of the disclosure provides a vertical transmission equipment 1', the vertical transmission equipment 1' may include a power source 89, the power source 89 may be any suitable gear motor. As shown, the power source 89 may include a drive roller 891 which is clockwise or counterclockwise rotatable about a direction parallel to the axis AX. Optionally, the vertical transmission equipment 1' may adopt the aforementioned rail structure 20'. The drive roller 891 may contact an edge of the bridging structure 31 of the carrier 30 (e.g., a side of the distal portion 312) when the carrier 30 reaches a predetermined position that makes the positioning assembly 70 release the carrier 30. At that moment, the drive roller 891 can be rotated by being driven by the power source 89 so as to cause the carrier 30 and the positioning assembly 70 to swing back and forth about, for example, 10-20 degrees relative to the base 10.

It is noted that the contact area between the rail structure and the contacting structure may also be modified as required. Please refer to FIGS. 14-18, another embodiment of the disclosure provides a vertical transmission equipment 1a, the vertical transmission equipment 1a includes a rail structure 20a with at least one first flat portion 201a, at least one second flat portion 202a, and at least one slope portion 203a, where the first flat portion 201a, the second flat portion 202a, and the slope portion 203a are all significantly narrower than that of the previous embodiments. Correspondingly, a contacting structure 72a of a positioning assembly 70a may be in a form of roller or wheel. In such an arrangement, only the portion of the contacting structure 72a which is located adjacent to its circumference will be in contact with the first flat portion 201a, the second flat portion 202a, and the slope portion 203a, such that the contact area between the positioning assembly 70a and the rail structure 20a is largely reduced and thereby significantly reducing the friction during the movement of the carrier 30 along the rail structure 20a.

Figure 14:
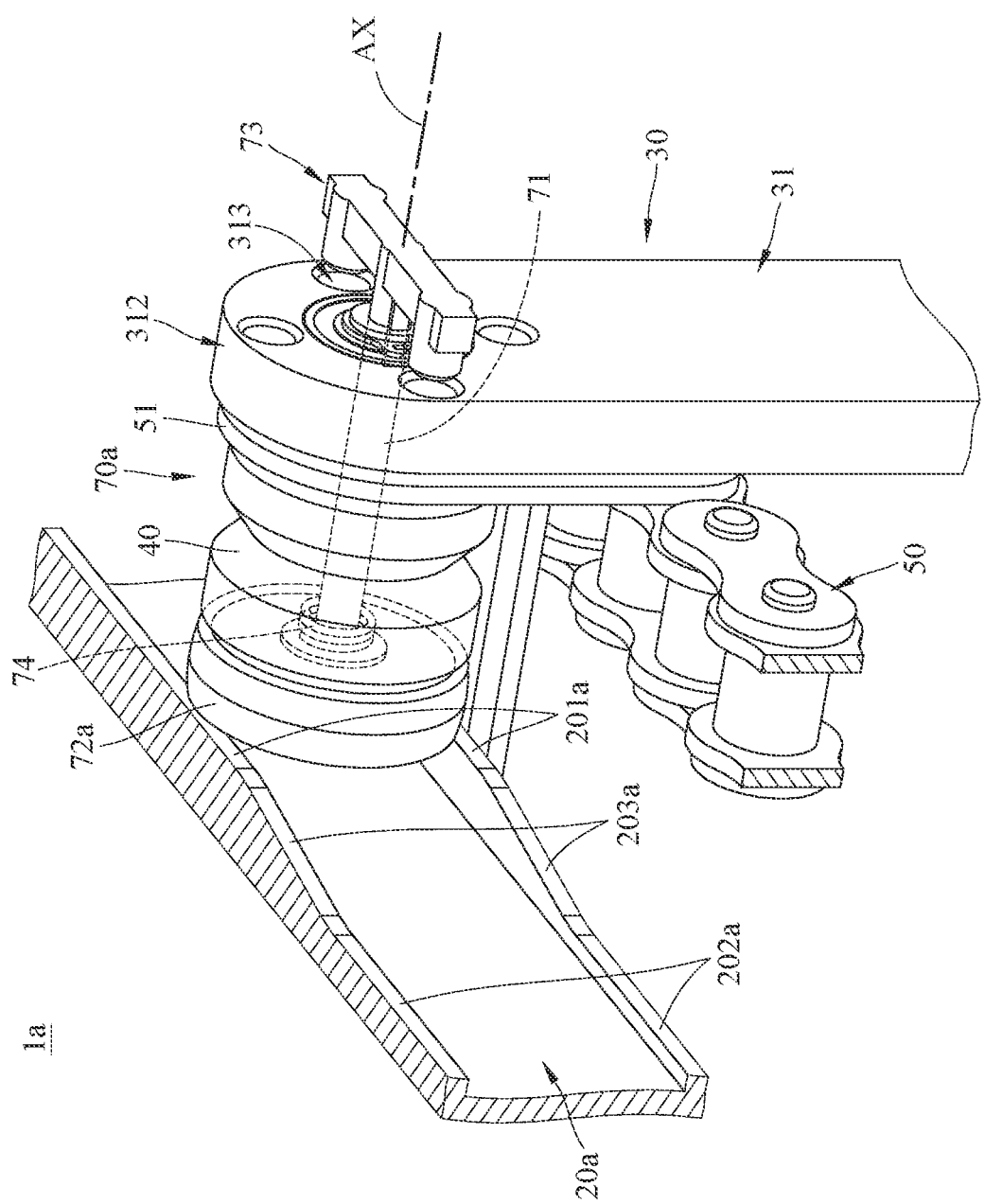
FIG. 14 is a partially-enlarged view of a vertical transmission equipment according to one embodiment of the disclosure.
Figure 15:
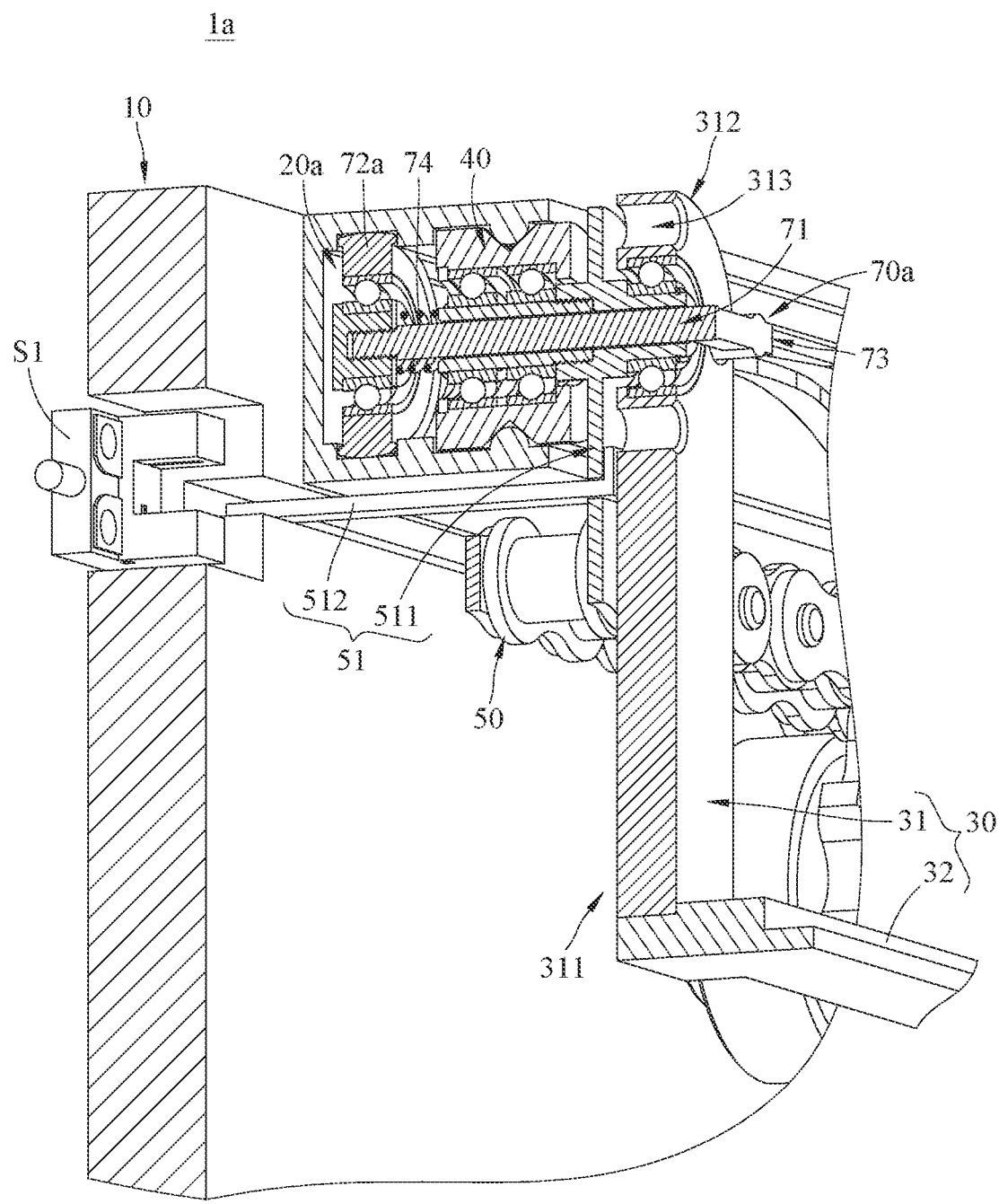
FIG. 15 is a partially-enlarged cross-sectional view of a vertical transmission equipment according to one embodiment of the disclosure.
Figure 16:
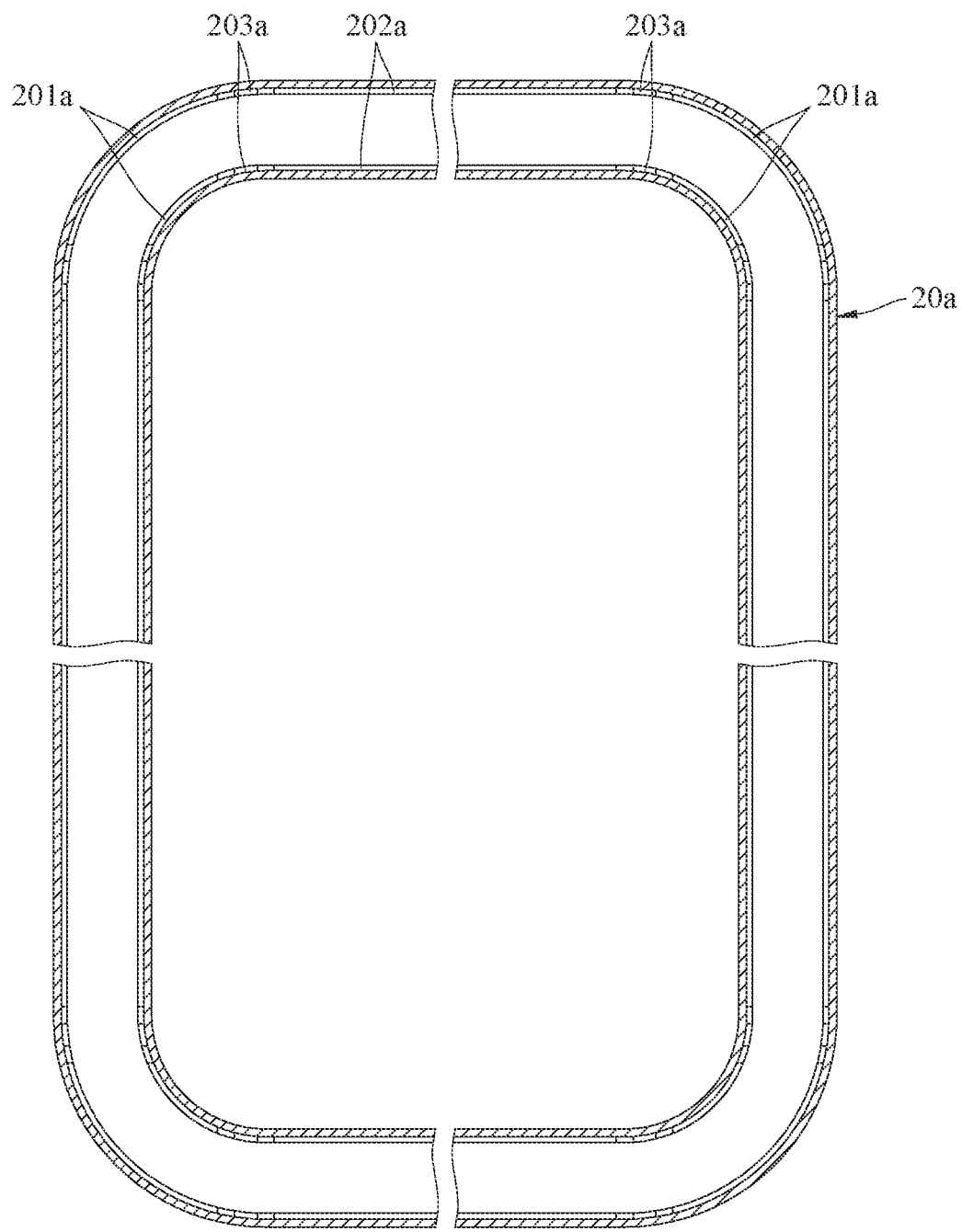
FIG. 16 is a front view of a rail structure according to one embodiment of the disclosure.
Figure 17:
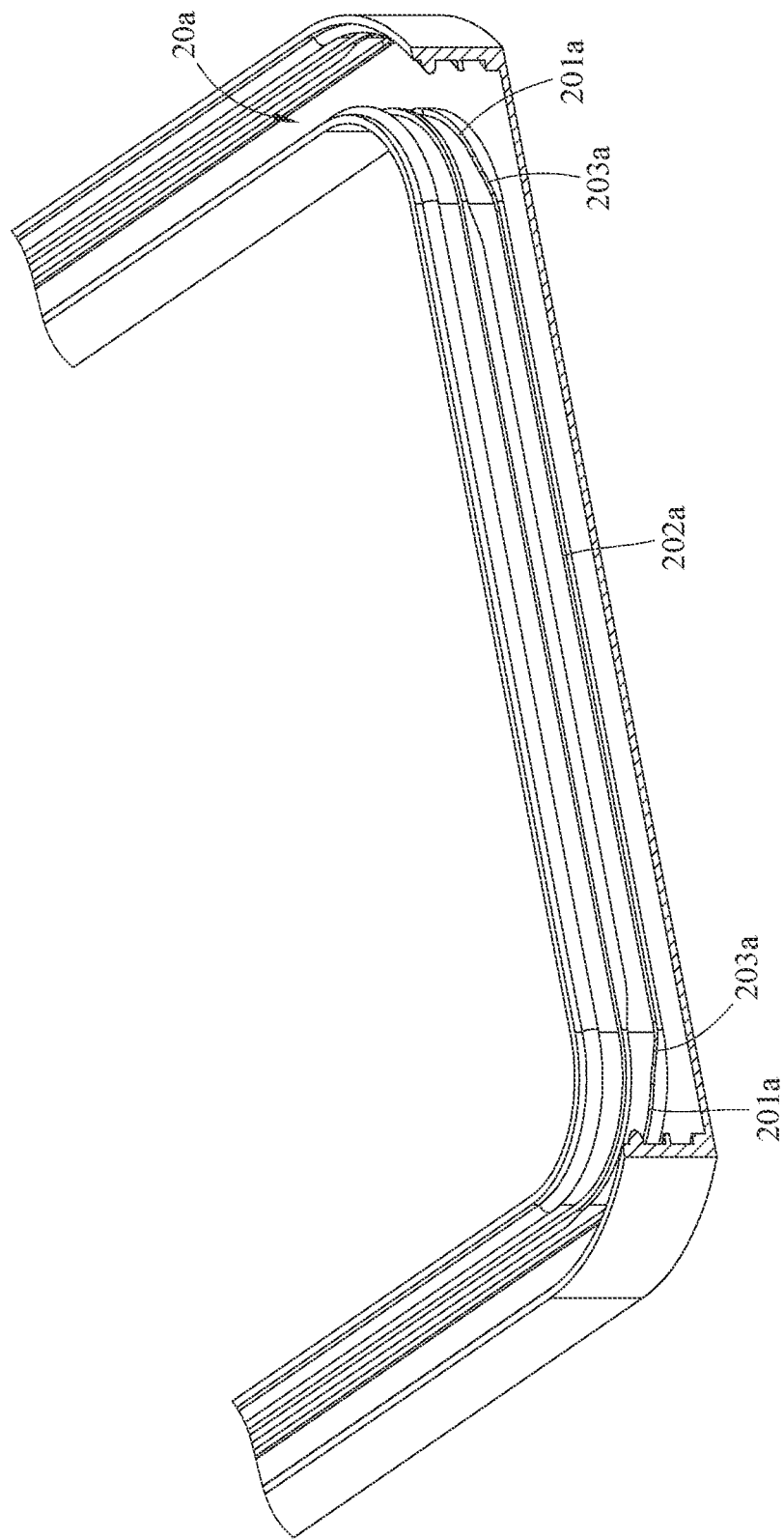
FIG. 17 is a partially-enlarged cross-sectional view of the rail structure of a vertical transmission equipment according to one embodiment of the disclosure.
Figure 18:
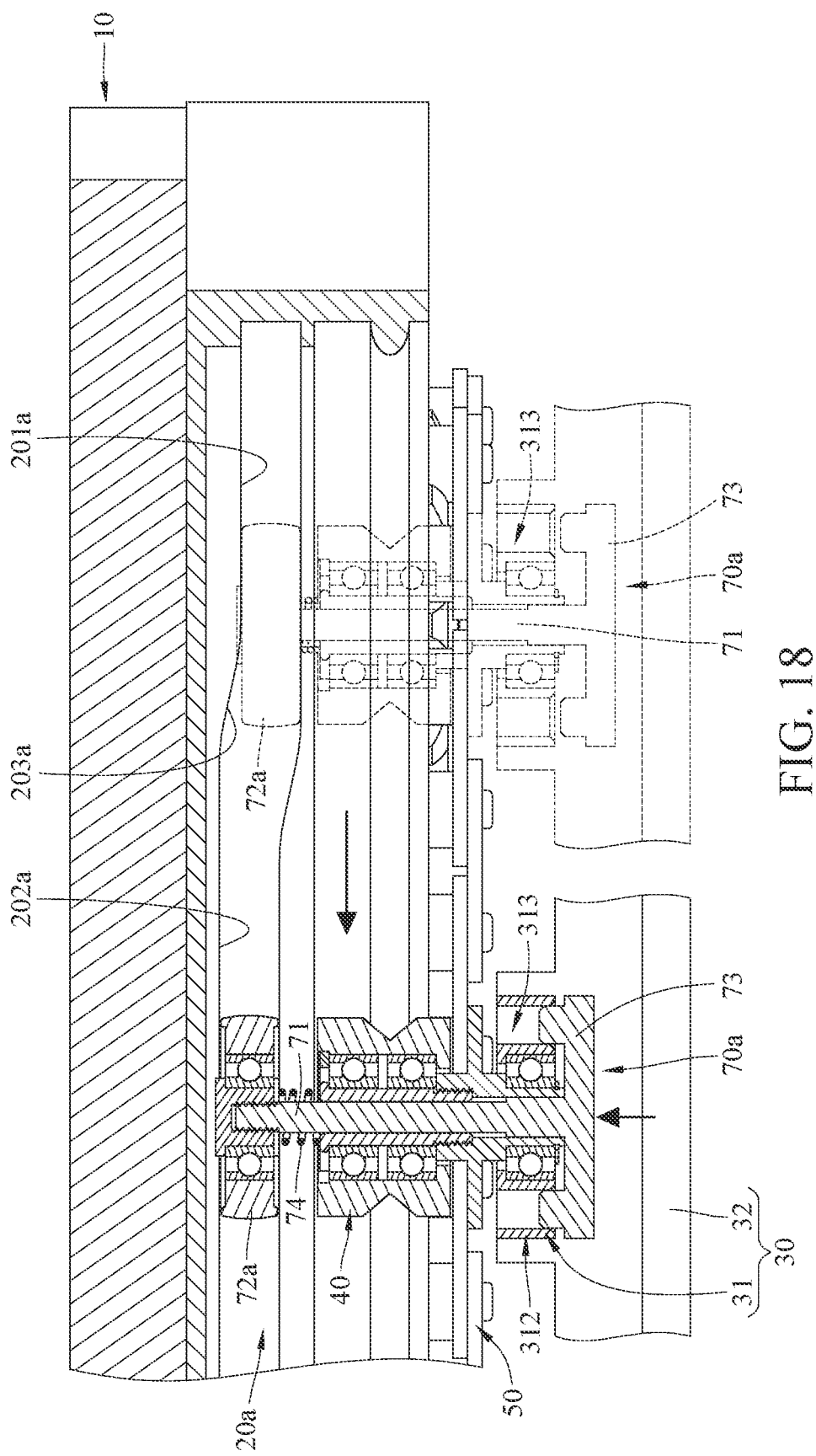
FIG. 18 depicts the movement of the positioning assembly of a vertical transmission equipment according to one embodiment of the disclosure.

Referring to FIG. 14 and FIG. 18, when the contacting structure 72a of the positioning assembly 70a is at the first flat portion 201a of the rail structure 20a, the first flat portion 201a can keep the contacting structure 72a in a position that makes the positioning structure 73 located away from the positioning holes 313 of the carrier 30. When the transmission component 50 moves the carrier 30 and the positioning assembly 70a over the slope portion 203a and get them to a position that corresponds to the second flat portion 202a, the second flat portion 202a can keep the contacting structure 72a in a position that makes the positioning structure 73 inserted into the positioning holes 313 of the carrier 30 and thereby securing the angle and position of the carrier 30 relative to the base 10 and the transmission component 50. As introduced, similar to the previous embodiments, the cooperation of the contacting structure 72a of the positioning assembly 70a and the surface contour of the rail structure 20a can selectively cause the positioning structure 73 of the positioning assembly 70a to secure and limit the angle and position of the carrier 30 when the carrier 30 is in a predetermined area.

Please refer to FIGS. 19-23, another embodiment of the disclosure provides a vertical transmission equipment 1b, the vertical transmission equipment 1b includes a carrier 30', the carrier 30' includes a bridging structure 31' with at least one positioning hole 313 located at a surface of the bridging structure 31' which faces towards the roller member 40. Correspondingly, the vertical transmission equipment 1b includes a positioning assembly 70b with a positioning structure 73b which extends towards a direction away from the roller member 40. The vertical transmission equipment 1b includes a rail structure 20b with at least one second flat portion 202b arranged at the corner of the rail structure 20b and at least one first flat portion 201b arranged at the straight portion of the rail structure 20b.

Figure 19:
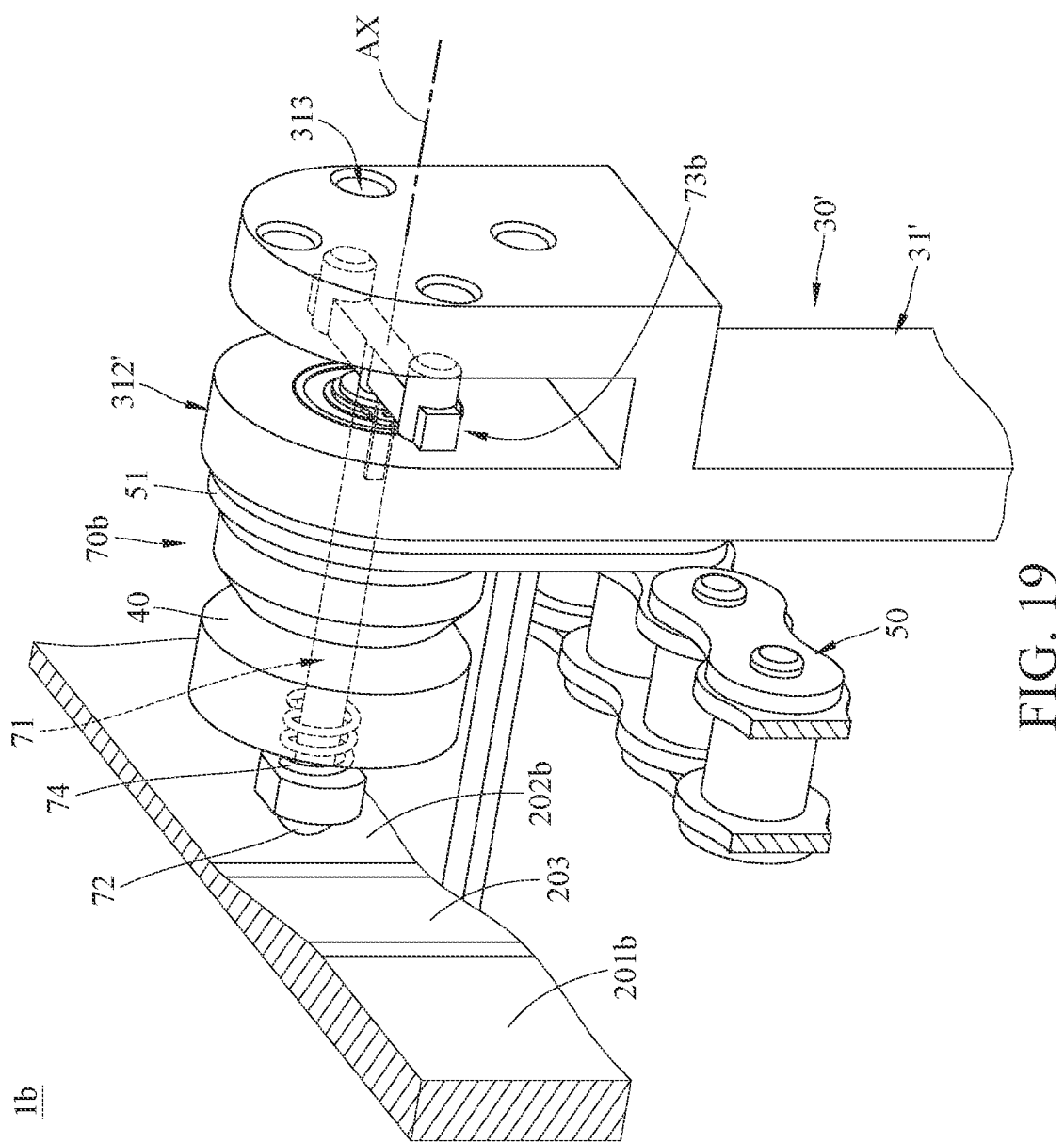
FIG. 19 is a partially-enlarged view of a vertical transmission equipment according to one embodiment of the disclosure.
Figure 20:
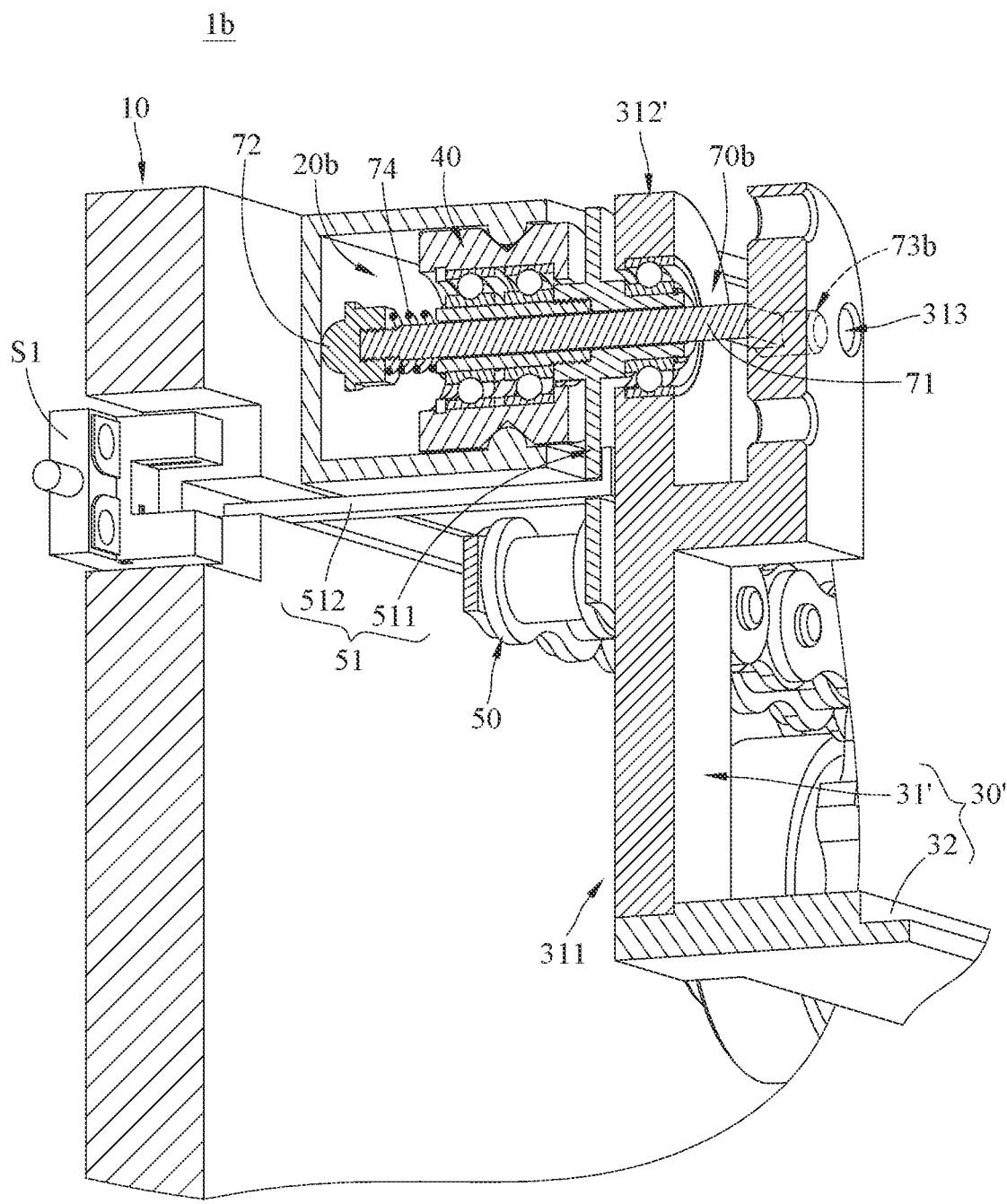
FIG. 20 is a partially-enlarged cross-sectional view of a vertical transmission equipment according to another embodiment of the disclosure.
Figure 21:
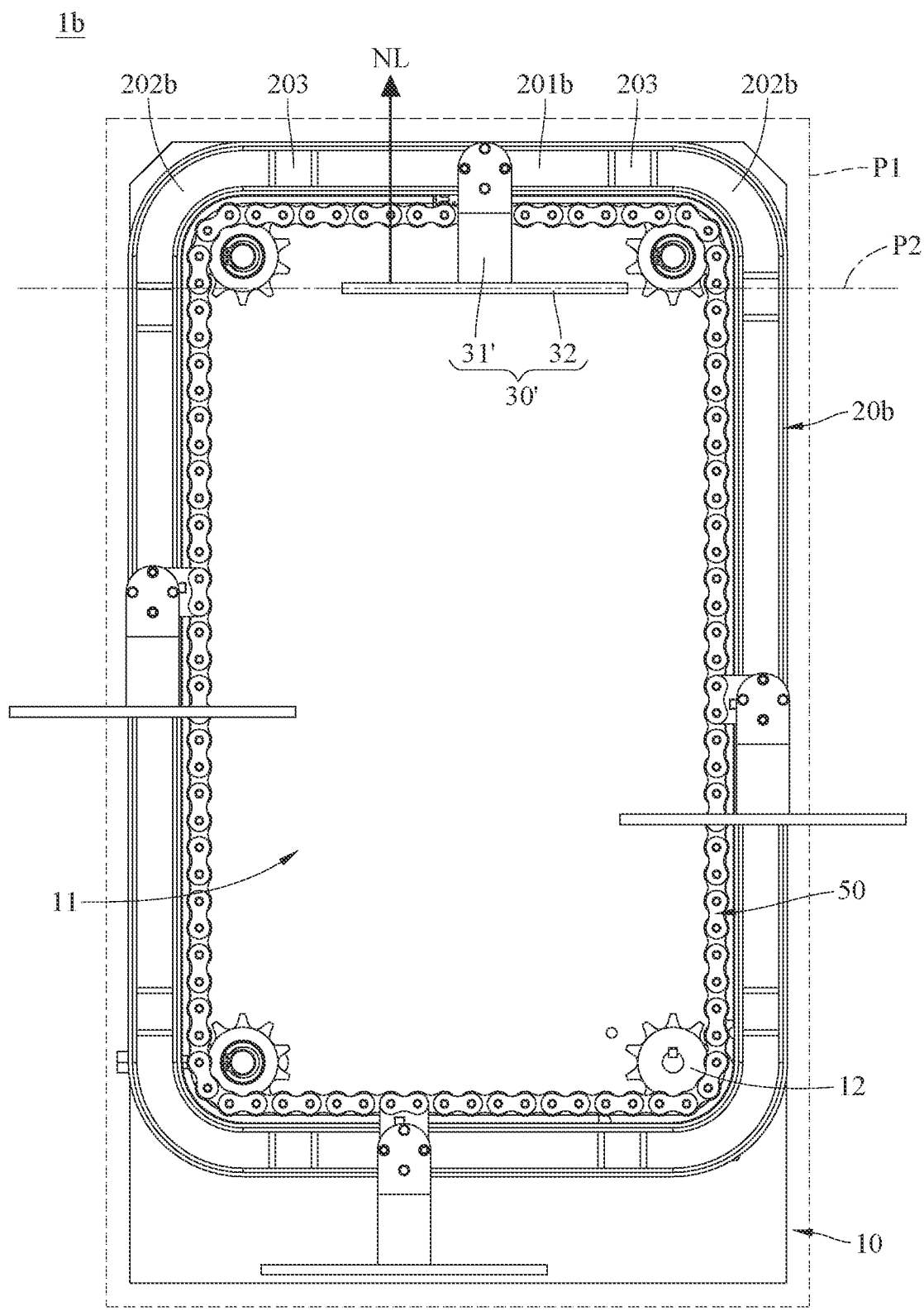
FIG. 21 is a front view of a vertical transmission equipment according to one embodiment of the disclosure.
Figure 22:
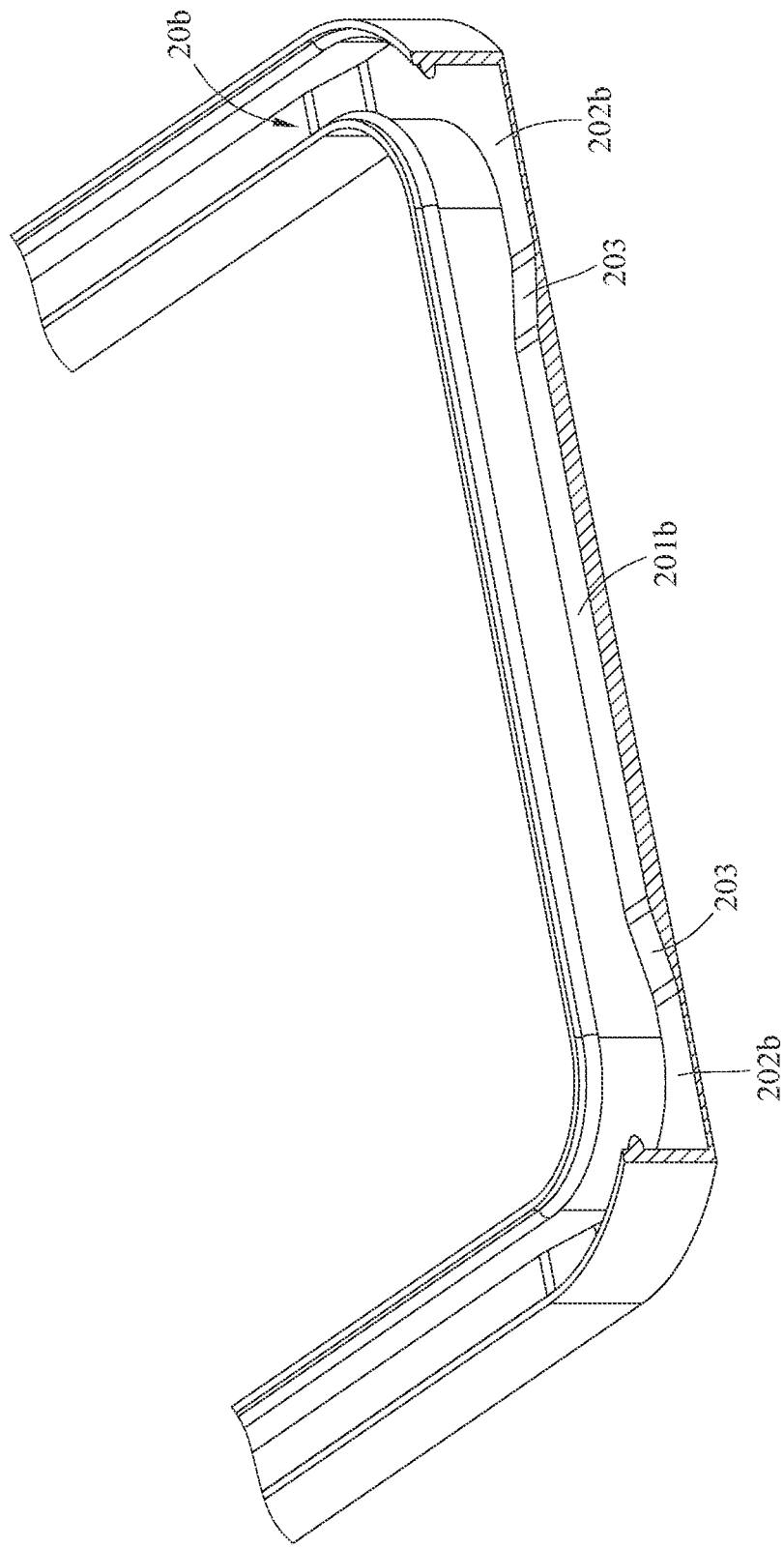
FIG. 22 is a partially-enlarged cross-sectional view of the rail structure of a vertical transmission equipment according to one embodiment of the disclosure.
Figure 23:
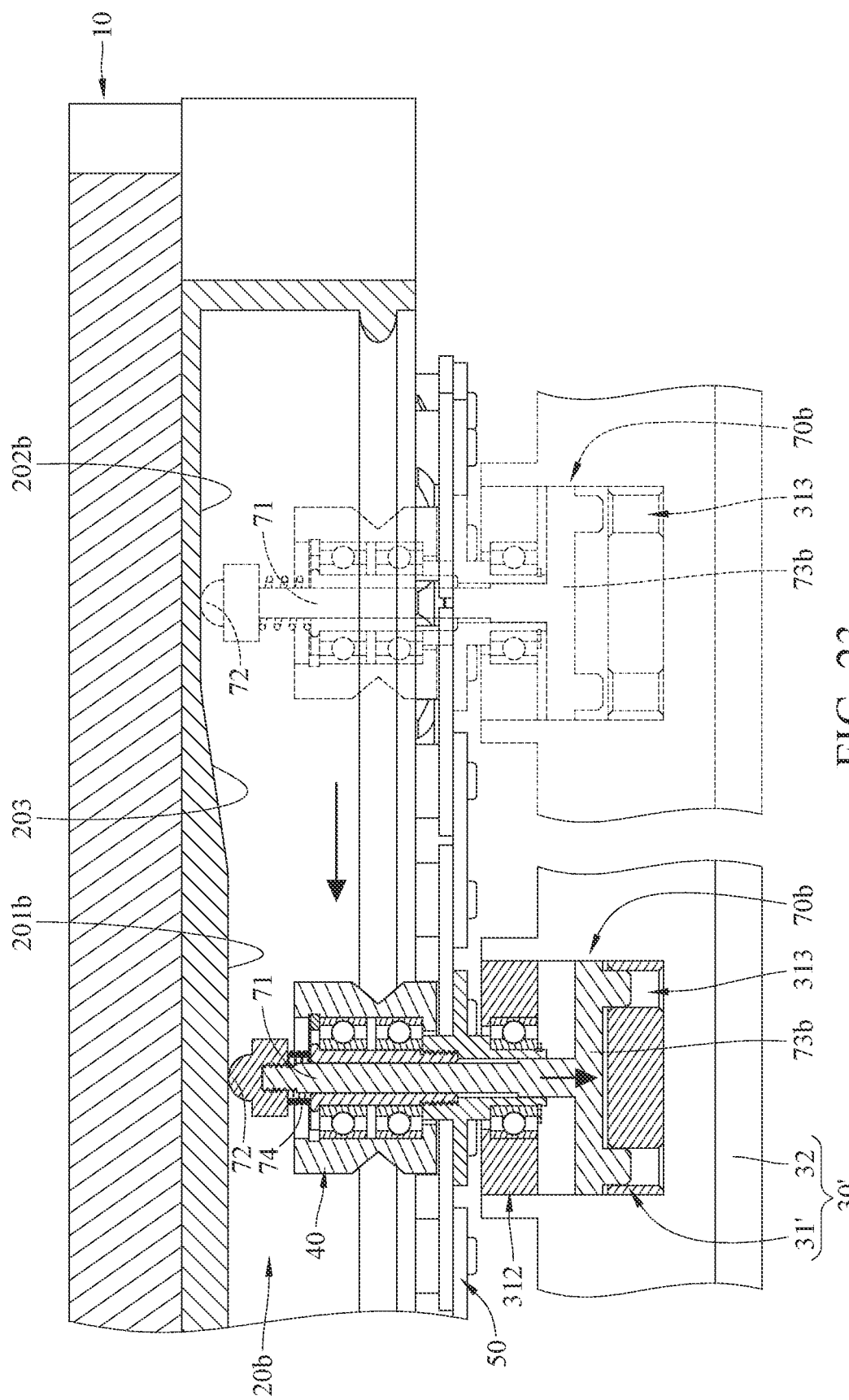
FIG. 23 depicts the movement of the positioning assembly of a vertical transmission equipment according to one embodiment of the disclosure.

Referring to FIG. 19 and FIG. 23, when the contacting structure 72 of the positioning assembly 70b is at the second flat portion 202b of the rail structure 20b, the second flat portion 202b can keep the contacting structure 72 in a position that makes the positioning structure 73b located away from the positioning holes 313 of the carrier 30'. When the transmission component 50 moves the carrier 30' and the positioning assembly 70b over the slope portion 203 and get them to a position that corresponds to the first flat portion 201b, the first flat portion 201b can keep the contacting structure 72 in a position that makes the positioning structure 73b inserted into the positioning holes 313 of the carrier 30' and thereby securing the angle and position of the carrier 30' relative to the base 10 and the transmission component 50. As introduced, similar to the previous embodiments, the cooperation of the contacting structure 72 of the positioning assembly 70b and the surface contour of the rail structure 20b can selectively cause the positioning structure 73b of the positioning assembly 70b to secure and limit the angle and position of the carrier 30' when the carrier 30' is in a predetermined area.

According to the vertical transmission equipments as discussed in the above embodiments of the disclosure, the supporting surface of the carrier is perpendicular to the mount surface of the base, the supporting surface of the carrier does not overlap with the rail structure in the normal line of the supporting surface of the carrier, or the supporting surface of the carrier is perpendicular to the imaginary plane which is defined by the transmission path of the carrier, thus the supporting surface of the carrier is movably kept in an angle perpendicular to the base. In other words, the vertical transmission equipment achieves a well carrier capable of movable in vertical manner, which makes the vertical transmission equipment take lesser horizontal space and therefore is favorable for increasing the number of equipments in a laboratory constrained by limited space.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A vertical transmission equipment, comprising:
a base comprising a mount surface;
a carrier movably disposed on the base and comprising a supporting surface, and a well plate being supported by the supporting surface;
a positioning assembly disposed on the base, and the carrier being selectively positioned by the positioning assembly; and
a rail structure and a roller member, wherein the rail structure is disposed on the mount surface, the roller member is movably disposed on the rail structure, the carrier comprises a bridging structure and a supporting structure, the bridging structure is pivotally connected to the roller member and is connected to the supporting structure, and the supporting surface is located on the supporting structure;
wherein the positioning assembly comprises a contacting structure, a shaft, and a positioning structure, the contacting structure slidably contacts the rail structure, the shaft is connected between the contacting structure and the positioning structure and disposed through the roller member and the bridging structure, the bridging structure is pivotally connected to the roller member via the shaft, the bridging structure comprises a plurality of positioning holes, the shaft is located between the plurality of positioning holes, the positioning structure is selectively inserted into the plurality of positioning holes, and when the positioning assembly is inserted into the plurality of positioning holes, the carrier is positioned;
wherein the supporting surface of the carrier is perpendicular to the mount surface of the base.

2. The vertical transmission equipment according to claim 1, wherein the rail structure comprises a first flat portion, a slope portion, and a second flat portion, the slope portion is connected between the first flat portion and the second flat portion, the slope portion is inclined relatively to the first flat portion and the second flat portion, when the contacting structure of the positioning assembly is at the first flat portion, the positioning structure is inserted into the plurality of positioning holes, and the carrier is positioned, and when the contacting structure is at the second flat portion, the positioning structure is removed from the plurality of positioning holes.

3. The vertical transmission equipment according to claim 2, wherein the plurality of positioning holes of the bridging structure are formed on a surface of the bridging structure which is located away from the roller member.

4. The vertical transmission equipment according to claim 2, wherein the plurality of positioning holes of the bridging structure are formed on a surface of the bridging structure which faces towards the roller member.

5. The vertical transmission equipment according to claim 2, further comprising an elastic component sleeved on the shaft and connected between the contacting structure and the roller member, and the contacting structure is selectively in contact with the first flat portion, the second flat portion, or the slope portion by being forced by the elastic component.

6. The vertical transmission equipment according to claim 1, further comprising a first sensor and a transmission component, wherein the first sensor is disposed on the base, the transmission component is movably disposed on the base, the transmission component comprises a plate portion and a protrusion structure protruding from the plate portion, a part of the plate portion is pivotally connected between the roller member and the bridging structure of the carrier, and when the positioning structure is inserted into the plurality of positioning holes, the protrusion structure is sensed by the first sensor.

7. The vertical transmission equipment according to claim 1, further comprising a drive roller disposed on the base and selectively in contact with the bridging structure of the carrier, and the carrier is caused by the drive roller to pivot relatively to the roller member.

8. A vertical transmission equipment, comprising:
a base;
a carrier movably disposed on the base and comprising a supporting surface, and a well plate is supported by the supporting surface;
a positioning assembly disposed on the base, and the carrier being selectively positioned by the positioning assembly; and
a rail structure and a roller member, wherein the base comprises a mount surface, the rail structure is disposed on the mount surface, the roller member is movably disposed on the rail structure, the carrier comprises a bridging structure and a supporting structure, the bridging structure is pivotally connected to the roller member and is connected to the supporting structure, and the supporting surface is located on the supporting structure;
wherein the positioning assembly comprises a contacting structure, a shaft, and a positioning structure, the contacting structure slidably contacts the rail structure, the shaft is connected between the contacting structure and the positioning structure and disposed through the roller member and the bridging structure, the bridging structure is pivotally connected to the roller member via the shaft, the bridging structure comprises a plurality of positioning holes, the shaft is located between the plurality of positioning holes, the positioning structure is selectively inserted into the plurality of positioning holes, and when the positioning assembly is inserted into the plurality of positioning holes, the carrier is positioned;
wherein the supporting surface of the carrier and the base are located without overlapping with each other in a normal direction of the supporting surface.

9. The vertical transmission equipment according to claim 8, wherein the rail structure comprises a first flat portion, a slope portion, and a second flat portion, the slope portion is connected between the first flat portion and the second flat portion, the slope portion is inclined relatively to the first flat portion and the second flat portion, when the contacting structure of the positioning assembly is at the first flat portion, the positioning structure is inserted into the plurality of positioning holes, and the carrier is positioned, and when the contacting structure is at the second flat portion, the positioning structure is removed from the plurality of positioning holes.

10. The vertical transmission equipment according to claim 9, wherein the plurality of positioning holes of the bridging structure are formed on a surface of the bridging structure which is located away from the roller member or is formed on a surface of the bridging structure which faces towards the roller member.

11. The vertical transmission equipment according to claim 8, further comprising a first sensor and a transmission component, wherein the first sensor is disposed on the base, the transmission component is movably disposed on the base, the transmission component comprises a plate portion and a protrusion structure protruding from the plate portion, a part of the plate portion is pivotally connected between the roller member and the bridging structure of the carrier, and when the positioning structure is inserted into the plurality of positioning holes, the protrusion structure is sensed by the first sensor.

12. A vertical transmission equipment, comprising:
a base;
a carrier comprising a supporting surface and movably disposed on the base along a transmission path;
a positioning assembly disposed on the base, and the carrier being selectively positioned by the positioning assembly; and
a rail structure and a roller member, wherein the rail structure is disposed on the base, the roller member is movably disposed on the rail structure, the carrier comprises a bridging structure and a supporting structure, the bridging structure is pivotally connected to the roller member and is connected to the supporting structure, and the supporting surface is located on the supporting structure;
wherein the positioning assembly comprises a contacting structure, a shaft, and a positioning structure, the contacting structure slidably contacts the rail structure, the shaft is connected between the contacting structure and the positioning structure and disposed through the roller member and the bridging structure, the bridging structure is pivotally connected to the roller member via the shaft, the bridging structure comprises a plurality of positioning holes, the shaft is located between the plurality of positioning holes, and the positioning structure is selectively inserted into the plurality of positioning holes to position the carrier;

wherein the supporting surface is perpendicular to an imaginary plane which is defined by the transmission path of the carrier.

13. The vertical transmission equipment according to claim 12, wherein the rail structure comprises a first flat portion, a slope portion, and a second flat portion, the slope portion is connected between the first flat portion and the second flat portion, the slope portion is inclined relative to the first flat portion and the second flat portion, when the contacting structure of the positioning assembly is at the first flat portion, the positioning structure is inserted into the plurality of positioning holes, and the carrier is positioned, and when the contacting structure is at the second flat portion, the positioning structure is removed from the plurality of positioning holes.

14. The vertical transmission equipment according to claim 12, wherein the plurality of positioning holes of the bridging structure are formed on a surface of the bridging structure which is located away from the roller member or is formed on a surface of the bridging structure which faces towards the roller member.

* * * * *